(12) United States Patent
O'Rear, III et al.

(10) Patent No.: US 7,879,403 B2
(45) Date of Patent: Feb. 1, 2011

(54) METHOD FOR MAKING AN ARTICLE WATER RESISTANT AND ARTICLES MADE THEREFROM

(75) Inventors: Edgar A. O'Rear, III, Norman, OK (US); Nantaya Yanumet, Sathorn (TH); Thirawudh Pongprayoon, Jana (TH); Boriphat Methachan, Hua-Wieng (TH)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 10/692,171

(22) Filed: Oct. 23, 2003

(65) Prior Publication Data

US 2005/0042467 A1 Feb. 24, 2005

Related U.S. Application Data

(63) Continuation of application No. 09/821,884, filed on Mar. 30, 2001, now abandoned.

(51) Int. Cl.
*B05D 1/40* (2006.01)
*B05D 3/02* (2006.01)

(52) U.S. Cl. .................................. 427/331; 427/372.2
(58) Field of Classification Search .............. 428/411.1, 428/500, 537.1, 537.5
See application file for complete search history.

(56) References Cited

U.S. PATENT DOCUMENTS

| | | | |
|---|---|---|---|
| 3,971,753 A | 7/1976 | Frechtling et al. | |
| 4,501,793 A | 2/1985 | Sarada | |
| 4,582,663 A | 4/1986 | Pickelman et al. | |
| 4,608,401 A | 8/1986 | Martin | |
| 4,770,906 A * | 9/1988 | Harwell et al. | 427/212 |
| 5,106,691 A * | 4/1992 | Harwell et al. | 428/411.1 |
| 5,623,015 A * | 4/1997 | Diehl et al. | 524/555 |
| 5,919,716 A * | 7/1999 | Raynolds et al. | 442/154 |

OTHER PUBLICATIONS

Somasundaran et al., "Mechanisms of Alkyl Sulfonate Adsorption at the Alumina-Water Interface", J. Phys. Chem., 70(1):90-96 (Jan. 1966).
Blumstein, "Polymerization in Preoriented Media", Adv. In Macromolecular Chem., Parsikas, ed. pp. 123-148, Academic Press, N.Y. (1970).
Mukerjee, "Analysis of Distribution Model for Micellar Solubilization Using Thermodynamics of Small Systems: Non-ideality of Solubilization of Benzoic Acid Derivatives in Nonionic Surfactants", J. Pharm. Sci., 60(10):1531-34 (Oct. 1971).
Dick et al., "Adsorption of Alkylbenzene Sulfonate (ABS) Surfactants at the Alumina Water Interface", J. Coll. Inter. Sci., 39(3):595-602 (Nov. 1971).
Cases et al., "Adsorption of N-Alkylanine Chlorides on Heterogenous Surfaces", AICHE Symposium Series, vol. 71, No. 150, pp. 100-109 (1975).
Letts et al., "Polymerization of Oriented Monolayers of Vinyl Stearate", J. Coll. Interface Sci., 56(1):64-75 (Jul. 1976).
Goujon et al., "On the Adsorption of N-Dodecyl-ammonium Chloride on the Surface of Synthetic Calcite", J. Coll. Interface Sci., 56(3):587-595 (Sep. 1976).
Fuerstenau et al., "Effect of pH on the Adsorption of Sodium Sodecanesulphonate at the Alumina/Water Interface", J. Chem. Soc. 59:157-180 (1976).
Enkelman et al., "Polymerization of Ordered Tail-to-Tail Vinyl Stearate Bilayers", J. Polym. Sci., Polym. Chem. Ed., 15:1843-54 (1977).
Day et al., "Polymerization of Diacetylene Carbonic Acid Monolayers at the Gas-Water Interface", J. Polym. Sci.: Polym. Ltrs. Ed., 16:205-210 (1978).
Trogus et al., "Adsorption of Mixed Surfactant Systems", J. Pet. Tech., vol. XXXI, pp. 769-778 (Jun. 1978).
Mukerjee, "Solubilization in Aqueous Micellar systems", Solution Chem. Of Surfactants, Mittal, ed., 1:153, Plenum Press, New York, N.Y. (1979).
Sagiv, "Organized Monolayers by Adsorption. 1. Formation and Structure of Oleophobic mixed Monolayers on Solid Surfaces", J. Am. Chem. Soc., 102(1): 92-98 (1980).
Barraud et al., "Polymerized Monomolecular Layers: A New Class of Ultrathin Resins for Microlithography", Thin Solid Films, 68:91-98 (1980).
Tieke et al., "Topochemical Reactions in Langmuir-Blodgett Multilayers", III Interface Syn., Carraler et al., eds., Marcel Dekker, N.Y. 1981, pp. 365-378.
O'Brien et al., "The Photopolymerization of Lipid-Diacetylenes in Bimolecular-Layer Membranes", J. Polym. Sci.: Polym. Chem. Ed., 19:95-101 (1981).
Scamehorn et al., "Adsorption of Surfactants on Mineral Oxide Surfaces from Aqueous Solutions", J. Coll. Interface Sci., 85(2): 463-478 (Feb. 1982).
Nunn et al., "Visual Evidence Regarding the Nature of Hemimicelles Through Surface Solubilization of Pinacyanol Chloride", J. Phys. Chem., 86:3271-72 (1982).
Harwell, "Surfactant Adsorption and Chromatographic Movement with Application in Enhanced Oil Recovery", Ch. 2—Doctoral Dissertation, pub. 1983 at University of Texas at Austin.
Netzer et al., "A New Approach to Construction of Artificial Monolayer Assemblies", J. Am. Chem. Soc., 105(3):674-676 (1983).
Netzer et al., "Adsorbed Monolayers v. Langmuir-Blodgett Monolayers—Why & How? I. From Monolayer to multilayer by Adsorption", Thin Solid Films, 99:235-41 (1983).

(Continued)

*Primary Examiner*—Sheeba Ahmed
(74) *Attorney, Agent, or Firm*—Hall, Estill, Hardwick, Gable, Golden & Nelson, P.C.

(57) ABSTRACT

The present invention relates in general to a method and variations thereof for making an article such as cloth water repellent and/or water resistant. In particular, the method involves the process of providing a thin-layer polymer coating on the article thereby rendering the article water repellent and/or water resistant. Articles made according to the method of the present invention are also disclosed and claimed herein.

1 Claim, 14 Drawing Sheets

OTHER PUBLICATIONS

Netzer et al., "Adsorbed Monolayers v. Langmuir-Blodgett Monolayers—Why & How? II. Characterization of Built-up Films Constructed by Stepwise Adsorption of Individual Monolayers", Thins Solid Films, 100:67-76 (1983).

Gan et al., "Polymerization in the Transparent Water-in-Oil Solutions (I). Methyl Methacrylate and the Copolymerizable Cosurfactant", J. Dispersion Sci. & Tech., 4(3): 291-312 (1983).

Gan et al., "Polymerization of Styrene in Water-Alcohol-Ionic Surfactant Solutions", J. Macromol. Sci. Chem., A19(5):, pp. 739-756 (1983).

Regen et al., "Polymer-Supported Membranes. A New Approach for Modifying Polymer Surfaces", Macromolecules, 16(2):335-338 (1983).

O'Brien et al., "Polymerization of 16-Heptadecenoic Acid Monolayers", Thin Solid Films, 102:131-140 (1983).

Olmsted et al., "Fluorescence of Polymerized Diacetylene Bilayer", J. Phys. Chem., 87:4790-4792 (1983).

Almgren et al., "Size of Sodium Dodecyl Sulfate Micelles in the Presence of Additives", J. Coll. Inter. Sci., 91(1): 256-266 (Jan. 1983).

Fendler, "Polymerized Surfactant Vesicles : Novel Membrane Memetic Systems", Science, 2223:887-894 (Mar. 1984).

Allara et al., "Spontaneously Organized Assemblies", (2 Parts), Langmuir 2 (1):45-66 (1985).

Harwell et al., "Pseudophase Separation Model for Surfactant Adsorption Isomerically Pure Surfactants", Langmuir, 1 (2): 251-262 (1985).

\* cited by examiner

Adsorption Isotherm of Surfactant (a)

(b)

(c)

(d)

Change in LAS and Styrene concentration with time in admicelle formation and adsolubilization steps.

Wetting time of treated fabric with reaction time [LAS concentration 1000 μM, LAS:Styrene ratio=1:10, Initiator:Styrene ratio=1:1, and Polymerization time=2 hrs at 80°C]

Wetting time of treated fabric with varying amount of initiator
[LAS concentration 1000 μM, LAS:Styrene ratio=1:10, and
Polymerization time=2 hrs at 80°C]

Wetting time of treated fabric with varying LAS concentration
[LAS:Styrene ratio=1:10, Initiator:Styrene ratio=1:1, and
Polymerization time=2 hrs at 80°C]

Wetting time of treated fabric with varying Styrene concentration
[LAS concentration 1000 μM, Initiator:Styrene ratio=1:1, and
Polymerization time=2 hrs at 80°C]

(a)

(b)

(c)

(d)

(a)

(b)

METHOD FOR MAKING AN ARTICLE WATER RESISTANT AND ARTICLES MADE THEREFROM

CROSS-REFERENCE TO RELATED APPLICATIONS

This application is a continuation of U.S. Ser. No. 09/821,884, filed Mar. 30, 2001 now abandoned, entitled "METHOD FOR MAKING AN ARTICLE WATER RESISTANT AND ARTICLES MADE THEREFROM".

STATEMENT REGARDING FEDERALLY SPONSORED RESEARCH OR DEVELOPMENT

Not Applicable.

BACKGROUND OF THE INVENTION

1. Field of the Invention

The present invention relates in general to a method and variations thereof for making an article, such as cloth, water repellent and/or water resistant. In particular, the method involves the process of providing a thin-layer polymer coating on the article thereby rendering the article water repellent and/or water resistant. Articles made according to the method of the present invention are also disclosed and claimed herein.

2. Brief Description of the Related Art

The formation of thin films on solid surfaces has been the subject of many studies by persons of ordinary skill in the art because of the wide variety of differing films and their individual and unique applications. The preparation of very thin polymer films in adsorbed surfactant bilayers has also been under study, but the results of such studies have oftentimes been inconclusive or unsatisfactory.

Thin film polymerization is carried out in a multi-step process based on the formation of micelle-like aggregates of physically adsorbed surfactants at a solid-solution interface. Such surface aggregates are termed admicelles or hemimicelles. Polymerization of monomers adsolubilized in the admicelles leads to the formation of a thin film on the solid substrate. This technique, which is called admicellar polymerization, is quite versatile and is applicable to a variety of surfaces. Various potential applications have been proposed for thin films formed by this technique such as in the microelectronic industry, particularly for the manufacture of miniaturized circuit patterns on silicon wafers. Other uses include solid lubrication, corrosion inhibition, optical coatings, and surface-modified electrodes.

The present invention is generally directed to a method for producing a hydrophobic cotton fabric wherein this hydrophobic cotton fabric involves a surface coated with a very thin film of polystyrene using an unique admicellar polymerization methodology. By using this method, the hydrophobic cotton fabric retains air permeability thereby allowing for production of a fabric that can be used to produce water repellent garments which are also comfortable to wear and easy to maintain/clean. The present invention, as disclosed and claimed herein, is the first time in the art that admicellar polymerization has been carried out on a textile fabric. Indeed, one of ordinary skill in the art would not have contemplated using such a methodology on a textile fabric because of the inherent misconception of those in the art as to the process of admicellar polymerization. A brief description of the processes and their consequential limitation as known in the art follows hereinafter.

Production of water-repellent textiles has developed from a traditional art to a highly specialized branch of technology during the past century. In the case of cotton, which is a hydrophobic fiber, water repellency is generally imparted by treating the surface of the fabric with a hydrophobic material. Examples of hydrophobic used include materials which have been wax, silicone, and fluorochemicals. Such a treatment usually involves the pad-and-dry process. To improve the breathability of the fabric, Formasa Taffeta Co. Ltd. in Taiwan developed a process employing a porous polyurethane coating to allow air and moisture to pass through the coated fabric. This water-repellent cotton had good air permeability due to the coating of a porous resin on the fabric with specially designed, tightly woven, cloth construction. However, this process resulted in a fabric which was much thicker and heavier than the original fabric. The present invention offers a new method for coating a thin film on a substrate such as cotton which provides a water repellant and/or water resistant fabric that is easily handled and has superior air permeability without creating a thicker than original textile.

The effects of counterion on surfactant adsorption are known in the art. It has been shown that the counterion giving the highest adsorption of surfactant, at a given surfactant and added electrolyte concentration, depends on both pH and fractional surface coverage. The results have suggested that any Region II/Region III transition in the adsorption of surfactant does not occur near the completion of the monolayer coverage nor as a result of electrostatic repulsion of surfactant ions from the mineral surface due to reversal of the net surface charge.

Wu et al. coated polystyrene on alumina surface by using sodium dodecyl sulfate (SDS) as the surfactant in a water/ethanol solution. The treated alumina was analyzed in two parts. The first part was analyzed by FTIR (KBr pellets) and the other one was extracted by tetrahydrofuran (THF) and analyzed by UV spectrophotometer. The results confirmed that admicellar polymerization occurred. Wu et al. found that the polymerization of styrene in the admicelle followed the case 1B model in the Smith-Ewart theory. After that, Wu et al. characterized the alumina surface coated with polystyrene. Film thickness ranged from 1.8 to 0.4 nm while BET surface area decreased from 94.7 to 57.8 $m^2/g$. The alumina surface changed from hydrophilic to hydrophobic while retaining the basic pore structure.

Esumi et al. studied polymerization on alumina powder by using sodium 10-undecenoate, which is a polymerizable surfactant. Esumi et al. formed a bilayer of surfactant and polymerized this layer through UV radiation. The dispersion of the alumina particles was studied by looking at mean particle size. Because hydrophilic groups of the surfactant in the second layer were in contact with the aqueous solution, the alumina particles were dispersed due to electrostatic repulsion. The results also showed that purging with nitrogen gas enhanced polymerization.

The incorporation of alcohols into admicelles is also known in the art. It has been found that the surfactant adsorption over most of the isotherm is enhanced dramatically by the presence of alcohol. As the chain length of alcohol is increased, the surfactant adsorption at regions of lower surfactant adsorption was enhanced. A two-site adsolubilization model has been proposed to interpret this complicated system. One of the alcohol sites was the same as in micelles, at the region between the headgroups of the surfactant. The other was a site not present in micelles, the hydrophobic perimeter arising from patchwise adsorption of the disk-shaped admicelle. This model was used to explain: (i) very high ratios of alcohol to surfactant adsorption at lower coverage, (ii) increase of surfactant adsorption below the CMC, and (iii) a slight decrease of plateau adsorption.

Coated polystyrene on precipitated silica is also known in the art. Several types of surfactants consisting of cationic surfactant (CTAB), nonionic surfactant (MACOL), and water-insoluble surfactant (ADOGEN) have been used. Two kinds of polymerization were tested: First, thermal polymerization, and secondly, REDOX polymerization. Due to the effect of head group packing density and length of alkyl chain, the results showed that CTAB adsorbed less than SDS and ADOGEN but greater than MACOL on this substrate. When using AIBN as an initiator, the ratio of initiator to monomer was necessarily high. It has been proposed that the ethanol used to dissolve AIBN consumed many of the radicals formed. For the REDOX system, as the ratio was lower, the reaction took longer to complete. The reduction in the molecular weight of the extractable polymer, as well as the increase in dispersity, was expected. As the chain length of the polymer increases it become more entangled in the surface and more difficult to extract.

Formation of polytetrafluoroethylene (PTFE) on aluminum oxide by admicellar polymerization is also known in the art. In these experiments, ammonium persulfate was used as the initiator. Sodium bisulfate (NaHSO$_4$) and ferrous sulfate (FeSO4) were used as initiator regulators thereby improving the initiator effectiveness at low temperature. The results showed that pressure was the main factor in the control of adsolubilization of the gaseous monomer tetrafluoroethylene into surfactant bilayers. The concentration of the initiator also affected polymerization indicating the analysis of kinetic data must take into account such as the concentration of the initiator. Polytetrafluoroethylene was successfully coated on both aluminum oxide powder and chips. Frictional behavior seemed to be related with film thickness and continuity.

The formation of thin polystyrene films on glass fiber surface has been attempted is known in the art as well. These experiments used the cationic surfactants dodecyl trimethylammonium bromide (DTAB) and cetylpyridinium chloride (CPC). The concentration of styrene used and testing method of treated fiber were tested the same as in the work of Wu et al., except that treated fiber was examined by SEM. The results showed that polystyrene can be coated on glass fiber surface but the SEM micrographs revealed a nonuniform coating on the surface. These experiments showed that polymerization was not restricted to the admicelles and that some polymerization occurred in the supernatant.

SUMMARY OF THE INVENTION

The present invention discloses and claims a method for providing a sheet of material having a hydrophobic polymer coating on at least one surface thereof. In one embodiment, the method comprises the following steps: (1) providing a sheet of material having a first surface and a second surface and possibly the sheet of material may also have a plurality of porous internal surfaces; (2) providing an aqueous hydrophobic coating composition containing a surfactant and a monomer of a hydrophobic polymer providing an initiator; (3) coating at least one of the first and second surfaces of the sheet of material with the aqueous hydrophobic coating composition; (4) introducing the initiator into the hydrophobic coating composition disposed on at least one of the first and second surfaces of the sheet of material; and (5) initiating a reaction on the sheet of material coated with the aqueous hydrophobic coating composition and the initiator for a predetermined period of time such that a hydrophobic polymer coating forms on at least one surface of the sheet of material.

In a preferred embodiment, the sheet of material is selected from the group consisting of cloth, burlap, natural and synthetic polymer films, polyesters, paper, cardboard and combinations thereof. In this embodiment and/or other embodiments, the surfactant is selected from the group consisting of sodium dodecyl sulfate, linear alkyl benzene sulfonate, and combinations thereof and the monomer of a hydrophobic polymer is styrene. In this same embodiment and/or other embodiments the initiator is sodium persulfate, or AIBN, which maybe introduced concurrently with the surfactant and monomer.

In yet a further preferred embodiment, the step of treating the sheet of material having the hydrophobic coating composition disposed on at least one of the first and second surface and the initiator introduced thereon is heated (i.e. treated) to a temperature of from about 40 degrees Celsius to about 100 degrees Celsius for a predetermined time of from about 30 minutes to about 180 minutes. Even more preferable, the sheet of material having the hydrophobic coating composition disposed on at least one of the first and second surface and the initiator introduced thereon is heated to a temperature of 80 degrees Celsius for a predetermined of time of 60 minutes.

In yet another embodiment of the present invention, a sheet of material having a hydrophobic polymer coating on at least one surface thereof, is prepared via a process. The process, in particular, comprises the steps of: (1) providing a sheet of material having a first surface and a second surface; (2) providing an aqueous hydrophobic coating composition containing a surfactant and a monomer of a hydrophobic polymer; (3) providing an initiator; (4) coating at least one of the first and second surfaces of the sheet of material with the aqueous hydrophobic coating composition; (5) introducing the initiator into the hydrophobic coating composition disposed on at least one of the first and second surfaces of the sheet of material; and treating the sheet of material coated with the aqueous hydrophobic coating composition for a predetermined period of time such that a hydrophobic polymer coating forms on at least one surface of the sheet of material.

In a preferred embodiment, the sheet of material is selected from the group consisting of cloth, burlap, natural and synthetic polymer films, polyesters, paper, cardboard and combinations thereof. In this embodiment and/or other embodiments, the surfactant is selected from the group consisting of sodium dodecyl sulfate, linear alkyl benzene sulfonate and combinations thereof and the monomer of a hydrophobic polymer is styrene. In this same embodiment and/or other embodiments the initiator is sodium persulfate, or AIBN. Also, in an alternative embodiment, the surfactant, monomer, and initiator may be introduced at the same time.

In yet a further preferred embodiment, the step oftreating the sheet of material having the hydrophobic coating composition disposed on at least one of the first and second surface and the initiator introduced thereon is heated (i.e. treated) to a temperature of from about 60 degrees Celsius to about 100 degrees Celsius for a predetermined time of from about 30 minutes to about 180 minutes. Even more preferable, the sheet of material having the hydrophobic coating composition disposed on at least one of the first and second surface and the initiator introduced thereon is heated to a temperature of 80 degrees Celsius for a predetermined of time of 60 minutes.

DETAILED DESCRIPTION OF THE INVENTION

Figure 1:
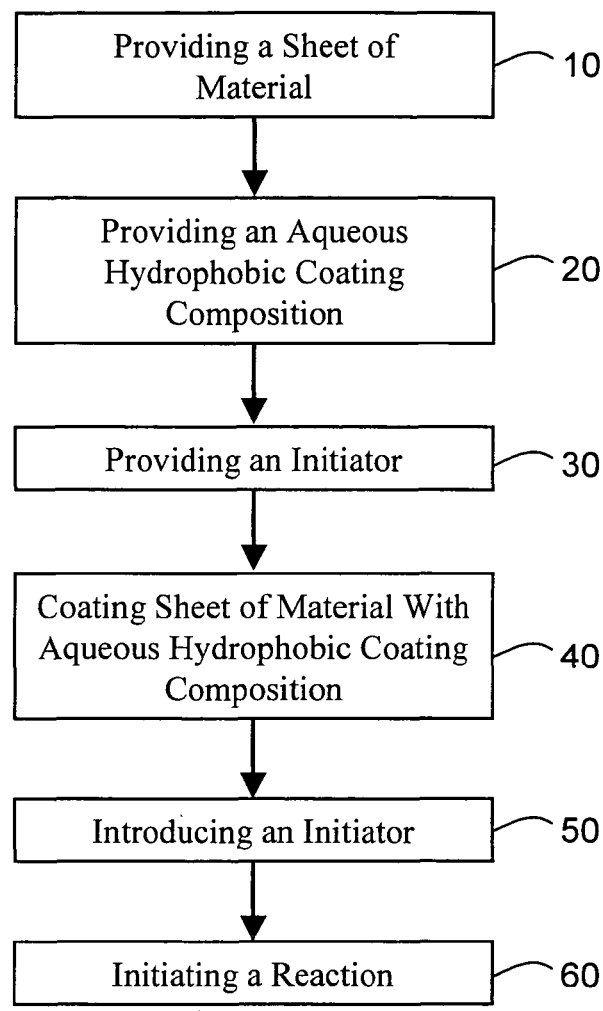
FIG. 1 is a schematic flow diagram view of the methodology of the present invention.

Before explaining in detail at least one embodiment of the invention in detail by way of exemplary drawings experimentation and results, it is to be understood that the invention is not limited in its application to the details of construction and the arrangement of the components set forth in the following description, experimental results, or illustrated in the drawings. The invention is capable of other embodiments or of being practiced or carried out in various ways. Also, it is to be understood that the phraseology and terminology employed herein is for purpose of description and should not be regarded as limiting.

The present invention encompasses a method for making an article, such as cloth, water repellent and/or waterproof. In general, the method includes the following steps (shown generally in FIG. 1): (1) providing 10 a sheet of material having a first surface and a second surface; (2) providing 20 an aqueous hydrophobic coating composition containing a surfactant and at least one monomer of a hydrophobic polymer; (3) providing 30 an initiator; (4) coating 40 at least one of the first and second surfaces of the sheet of material with the aqueous hydrophobic coating composition; (5) introducing 50 the initiator into the hydrophobic coating composition disposed on at least one of the first and second surfaces of the sheet of material; and (6) initiating 60 a reaction on the sheet of material coated with the aqueous hydrophobic coating composition and the initiator for a predetermined period of time such that a hydrophobic polymer coating forms on at least one surface of the sheet of material.

Figure 2:
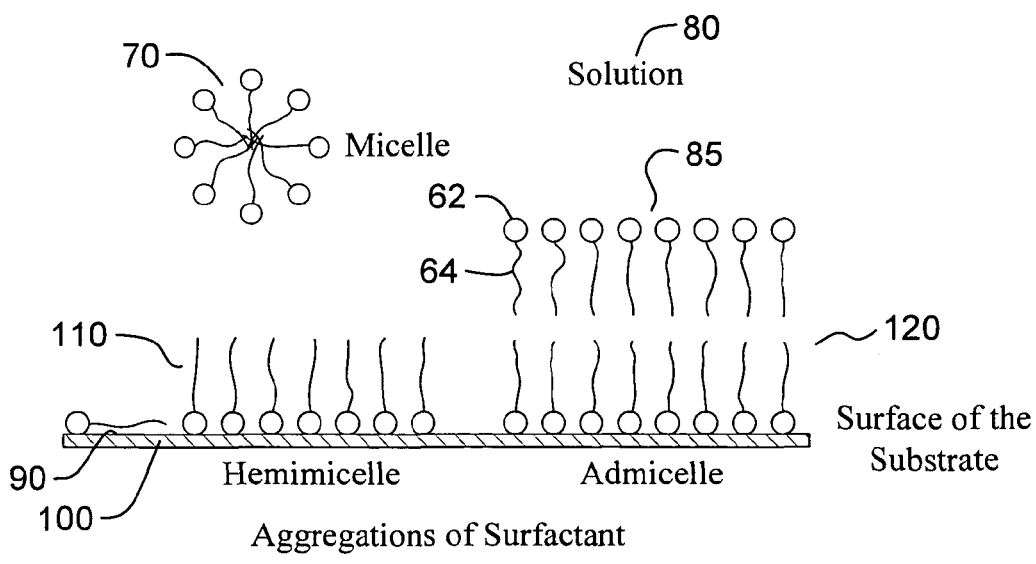
FIG. 2 is a representative view of aggregations of surfactant on a surface.

Surfactants are substances that are widely used for cleaning, enhanced oil recovery, construction, and pharmaceutical formulations. Surfactants tend to migrate to interfaces or form structures to create new molecular surfaces. A surfactant molecule consists of two parts, a head group 62 and a tail group 64 (as shown in FIG. 2). The head group 62 of a typical surfactant is hydrophilic or lipophobic, which is water-loving or oil-hating. The head group 62 is an ionic or highly polar group. In contrast, the tail group 64 is water hating or oil loving, which is called hydrophobic or lipophilic. The tail group 64 is usually a long-chain hydrocarbon. Depending on the nature of the hydrophilic group, surfactants are classified into four types. Surfactants having a negative or positive charge on the hydrophilic group are called anionic or cationic, respectively. Surfactants with both a positive and negative charge are called zwitterionic. The last type consists of surfactant molecules with no apparent charge on the hydrophilic group. They are called nonionic surfactants.

Surfactant aggregation in solution has many forms. The most well known form is a micelle 70 as shown in FIG. 2. Micelles 70 are suspended in solution 80. Surfactants can also adsorb onto a surface 90 of a substrate 100 by means of electrostatic attraction. They can adsorb with or without aggregation. If the aggregation on the surface 90 of the substrate 100 consists of only one layer, it is called a hemimicelle 110. If it consists of two layers, it has been called an admicelle 120.

Figure 3:
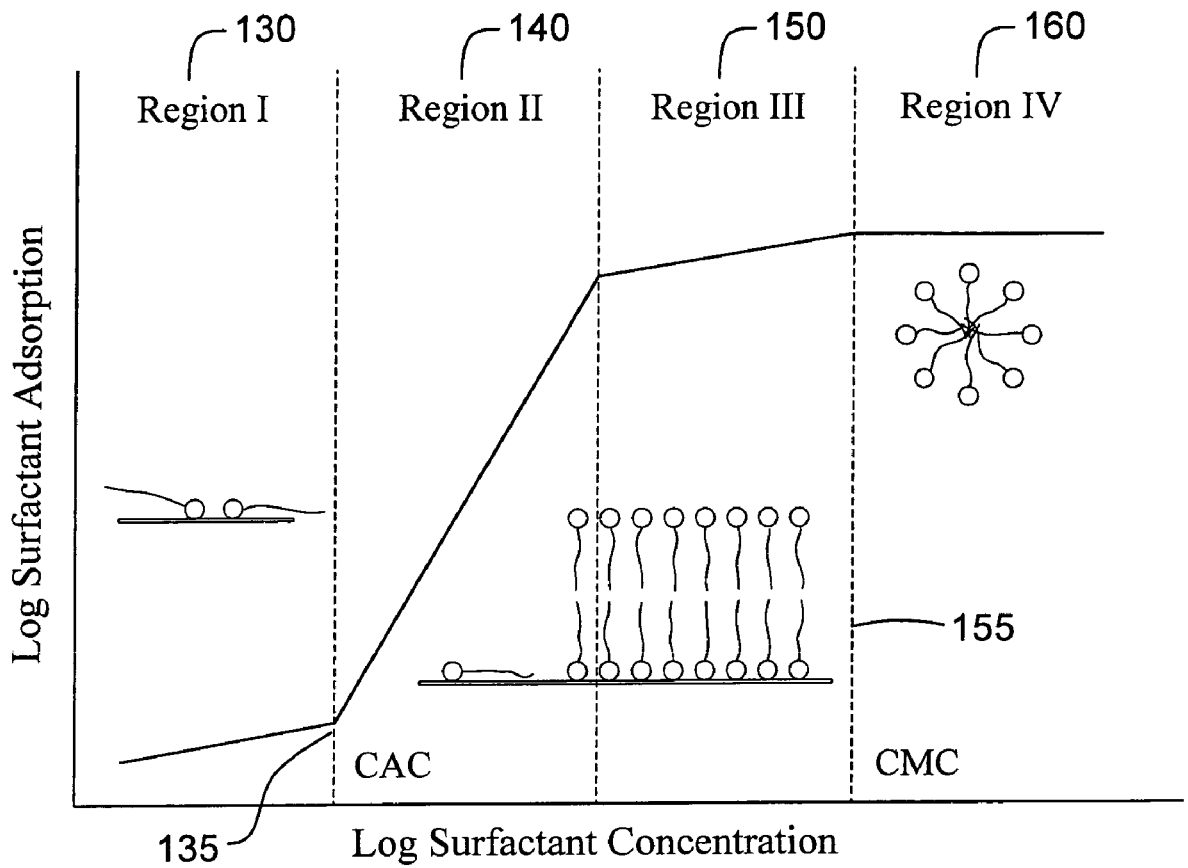
FIG. 3 is a graph view of an adsorption isotherm of a surfactant used in the present invention.

One parameter that determines the aggregation of surfactant is the surfactant concentration as shown in FIG. 3, an adsorption isotherm. The adsorption isotherm shown in FIG. 3 is the plot between log of surfactant concentration and log of surfactant adsorbed onto the surface 90 of the substrate 100. The adsorption isotherm shown in FIG. 3 can be divided into four regions. In Region I 130, the surfactant adsorbs onto the surface 90 mainly by ion exchange without aggregation. In Region II 140, there is a sharp increase in adsorption, resulting from interaction of the hydrophobic chains of oncoming surfactant with those of previously adsorbed surfactant. The concentration at which the isotherm moves from Region I 130 to Region II 140 is called the critical admicelle concentration (CAC) 135. In Region III 150 the slope of the isotherm is reduced because the surface of the substrate 100 is becoming saturated and, thus, further adsorption must overcome electrostatic repulsion between the oncoming surfactant and the similarly charged solid. In Region IV 160, any further increase in the surfactant concentration will lead to micelle formation in the solution 80 with no further adsorption on the substrate 100 and the isotherm remains constant. The concentration at which the isotherm moves from the Region III 150 to Region IV 160 is called the critical micelle concentration (CMC) 155.

Figure 4:
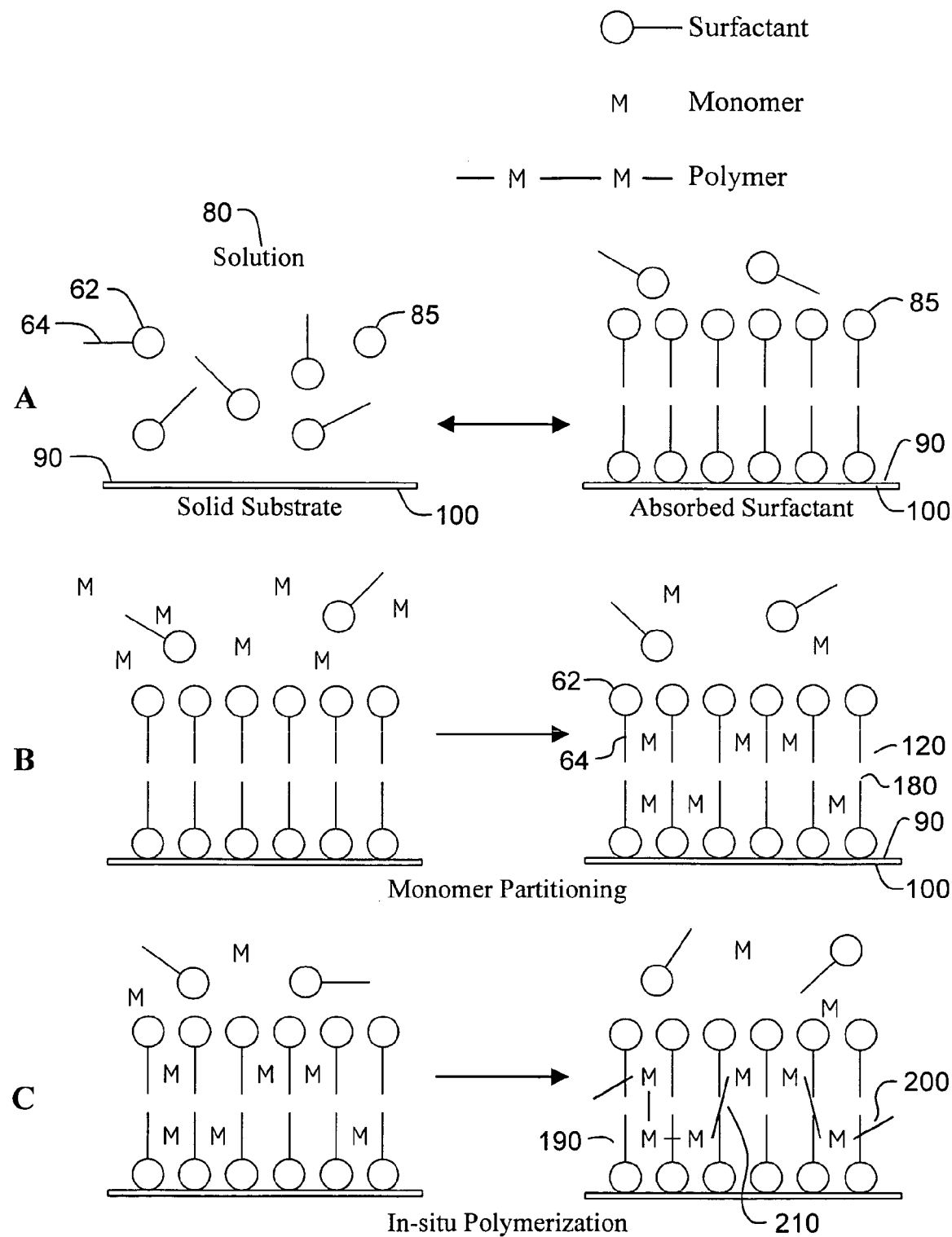
FIGS. 4A-C are a diagrammatic representation of the steps of admicellic polymerization.

Admicellar polymerization consists of three main steps to produce a thin-film of polymer and is shown in FIGS. 4A-C. Step 1, as shown in FIG. 4A, consists of admicelle 120 formation by adsorption of surfactant 85 from the aqueous solution 80 to the surface 90 of the substrate 100. The aggregation of surfactant 85 depends on several parameters. One parameter that determines the aggregation of surfactant 85 is surfactant concentration. The initial feed concentration of surfactant is generally chosen close to but below the critical micelle concentration (CMC) 155 to avoid emulsion polymerization in micelles 70 and to maximize admicelle 120 formation. The choice of surfactant is influenced by the point of zero charge (PZC) of the surface. The surface becomes positive at pH values below the PZC, but negative above the PZC. Consequently, anionic surfactants adsorb better below the PZC and cationic surfactants above the PZC. Thus, surfactant molecular structure also effects adsorption. The addition of salt reduces the repulsion between head groups 62 of the surfactants 85 and causes the surfactant molecules to come closer together.

Step 2, as shown in FIG. 4B, is the solubilization of a monomer 170 into the micelle 70. Step 2 is called adsolubilization. The monomers 170, which are nearly insoluble in water, diffuse from aqueous solution 80 and solubilize in the hydrophobic interior 180 of the admicelle 120. Formally, adsolubilization is defined as the excess concentration of a species at an interface in the presence of the admicelle 120 that would not exist in the absence of the admicelle 120.

Step 3, as shown in FIG. 4C, is the in situ polymerization of the monomer 170. Once an initiator 190 is added, the polymerization reaction starts in the admicelles 120, which act as a reaction site or a two-dimensional reaction solvent for polymerization. The polymerization mechanism is similar to those that occur in conventional emulsion techniques.

After the formation of a polymer, excess surfactant 85 may be removed by washing. This leaves a thin polymer film 210 exposed over the surface 90 of the substrate 100.

Figure 5:
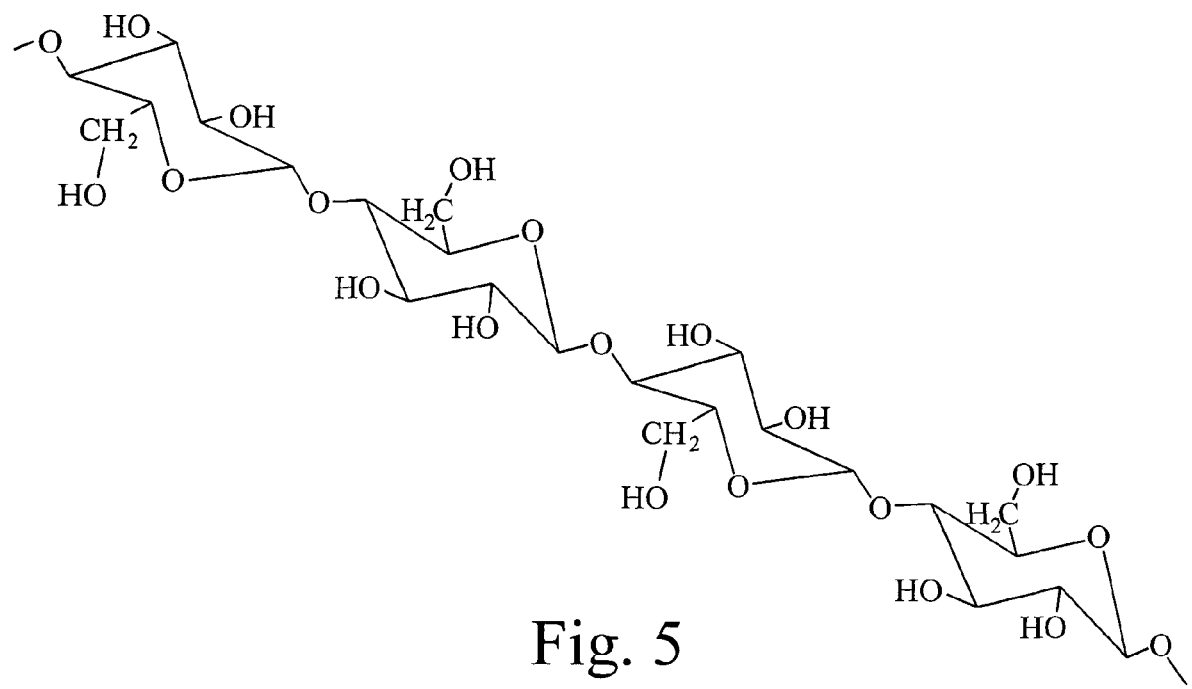
FIG. 5 is a diagrammatic representation of the chemical structure of cellulose.

Cotton is a natural fiber from the seeds of a plant in the genus Gossypium. It has an average diameter of 20 um and an average length of 1-1.5 inches. In its natural state, cotton consists mainly of cellulose with about 10-20% other substances such as, wax, pectin, hemicellulose, seed husks, and others. Normally, these impurities have to be removed prior to the dyeing process to improve the wettability and uniformity of fabric properties. Cleaned cotton usually consists of over 99% cellulose. The cellulose molecules in cotton mainly gathered in bundles in the form of fibrils which spiral around the fiber surface. The molecular structure of cellulose is shown in FIG. 5.

Cellulose contains extensive hydroxyl groups making it highly hydrophilic in its raw form. In making cotton water resistant and/or water repellant, normally a film of wax, silicone, or fluorocarbon, is coated on the fabric. This conventional treatment process consists of padding the fabric in a solution containing waterproofing agent followed by drying. This results in a thick film on the coated fibers making the fabric stiff. Furthermore, the coating reduces air permeability of the fabric thus making it unsuitable for use as clothing. Cotton treated according to the methodology of the present invention becomes water resistant and/or water repellant without such disadvantages of the methodology known in the art.

1. Preparation of the Cotton Fabric

A plain weave, medium-weight cotton fabric with a fabric weight of 150 g/m$^2$ was used. The fabric consisted of 120 threads per inch in both the warp and weft directions and the yarn number of the threads was 40. The fabric was desized, scoured, and bleached. Before use, any surfactant remaining in the fabric was first removed by washing the fabric in a washing machine at 90° C. several times until clean. Removal of any remaining surfactant was checked by boiling 2 g of fabric in 300 ml distilled water for 10 min. The fabric was judged acceptable when the absorbance of the resulting liquid at 225 nm, which is a wavelength giving the highest absorbance for linear alkylbenzenesulfonate (LAS), was below 0.08 (compared with the value of around 0.5 for an unwashed sample). The fabric after washing was air-dried and finally ironed to smooth out the surface.

2. Purification of Styrene Monomer

Prior to use, any inhibitor in a styrene monomer provided by Eternal Plastic Co. LTD. was removed by the method of Edward et al. (1973). Roughly equal parts of 10% NaOH solution and the styrene monomer were placed in a separatory funnel and mixed by tumbling. After the solution completely separated, the heavier aqueous phase was drained off and the procedure was repeated until a clear aqueous phase was obtained. The monomer was then washed with distilled water until litmus paper showed that all the base was removed. The purity of the styrene monomer was 99% mixed with inhibitor.

3. Admicellar Polymerization

A stock solution of 50 mM LAS provided by Unilever Thai Holding LTD. (carbon chain length between 8-12 atoms and average molecular weight of 344) was prepared using distilled water and its concentration confirmed by UV measurement at 225 nm, which is wavelength of highest absorbance for LAS. The molar extinction coefficient of LAS at 225 nm is $1.185 \times 10^4$ LmoV~$^1$ cm$^1$. The pH was adjusted to 4 by 0.02 M HCl and sodium chloride (NaCl) was added to the solution.

The solution of linear alkylbenzenesulfonate (LAS) was prepared of 1000 uM at pH4 and NaCl 0.15M. A 20 ml of LAS solution was pipetted into a 24 ml vial containing the desired amount of styrene monomer or mixed styrene with divinyl benzene of 1% and 2% of styrene monomer to give the desireably varied LAS:monomer ratios of 1:5. A 0.5 g cotton fabric piece was cut in a size 2.2×2.2 in$^2$ that exactly fits in the vertical position in the vial with no folding or overlapping. The vial was sealed with aluminum foil and the lid was screwed in. The desired amount of initiator, AIBN or $Na_2S_2O_8$ was injected into the vial. The vial was sealed again with aluminum foil. The sample was maintained at room temperature in the shaker for 8 hours. After that it was placed in the oven at 80° C. to start the polymerization step for 2 hours. After polymerization, the vial was cooled down with tap water and the treated fabric was removed.

4. Washing

The treated cotton fabric was washed by stirring in 500 ml tap water in a beaker for 2-3 minutes three times. The residual surfactant was then removed by placing several pieces of fabric in a beaker containing distilled water at a ratio of fabric and water equal to 1 g/200 ml. The beaker was placed in a temperature-controlled water bath at 80° C. for half an hour. The process was repeated until the absorbance of the washing liquid was less than 0.015 at wavelength 225 nm. At this absorbance, LAS concentration was 1.27 uM. The treated cotton was then dried in the oven at 110° C. for 4 h, and left to cool in a desiccator before taken out for a water hydrophobicity drop test.

5. Water Hydrophobicity Drop Test

Figure 6:
FIG. 6 is a series of photographic perspective views of the water hydrophobicity drop equipment and test results.
Figure 6:
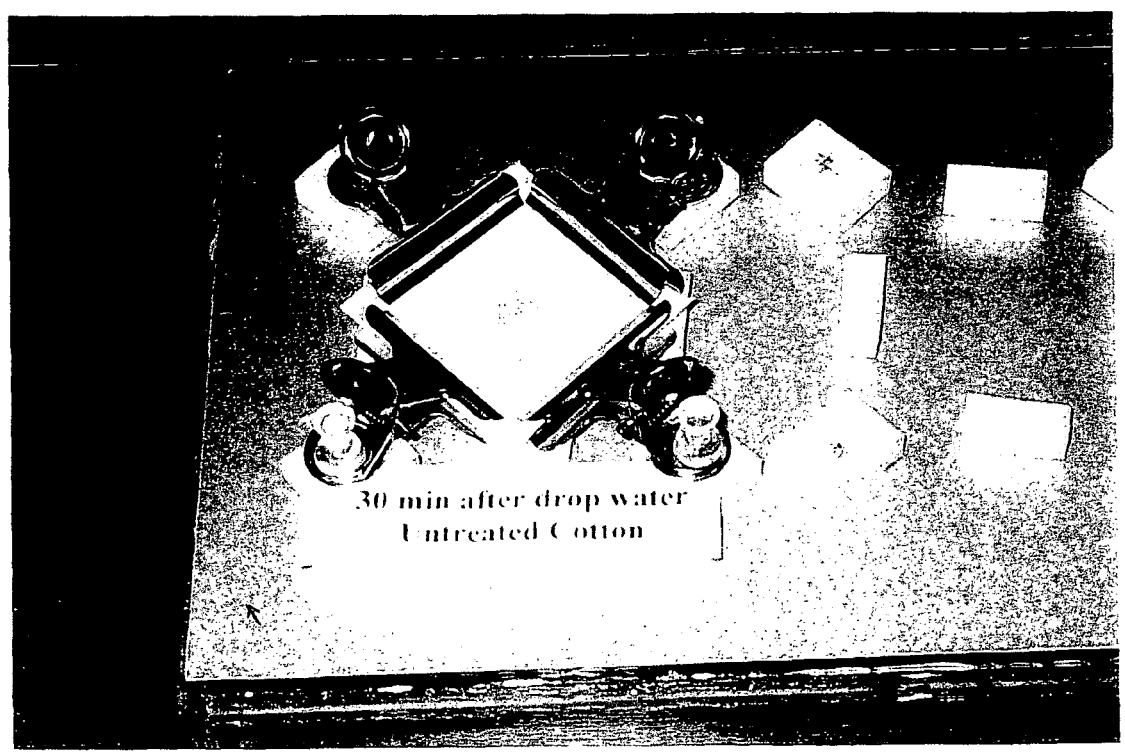
Figure 6:
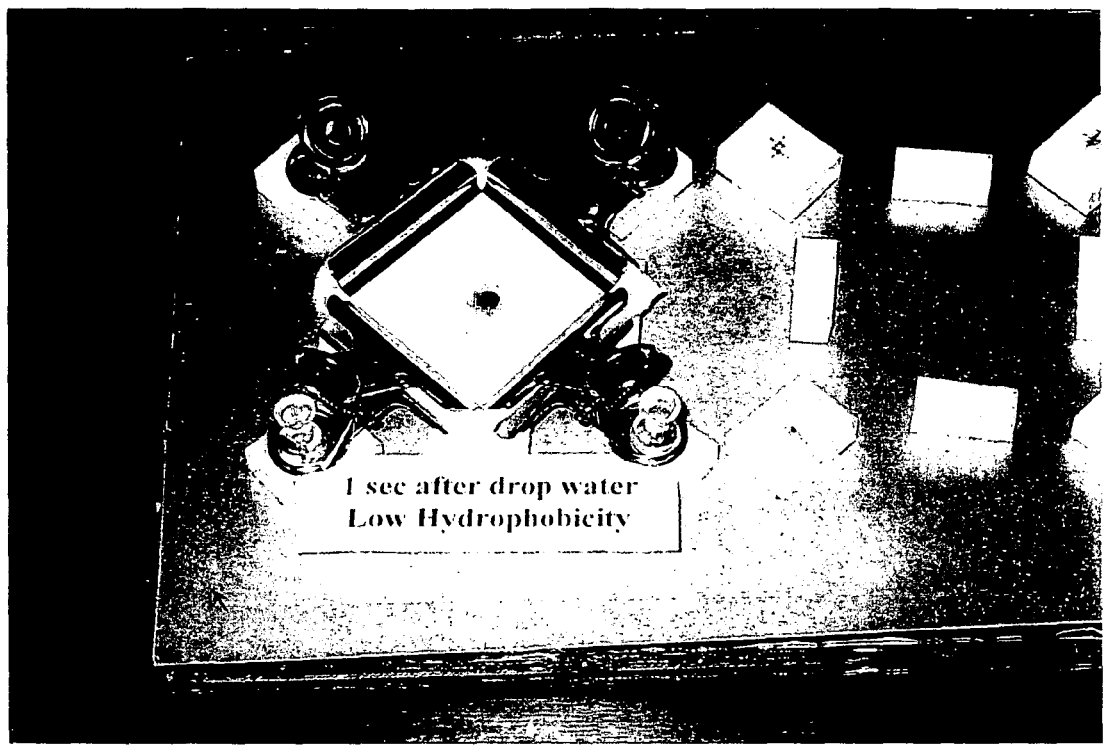
Figure 6:
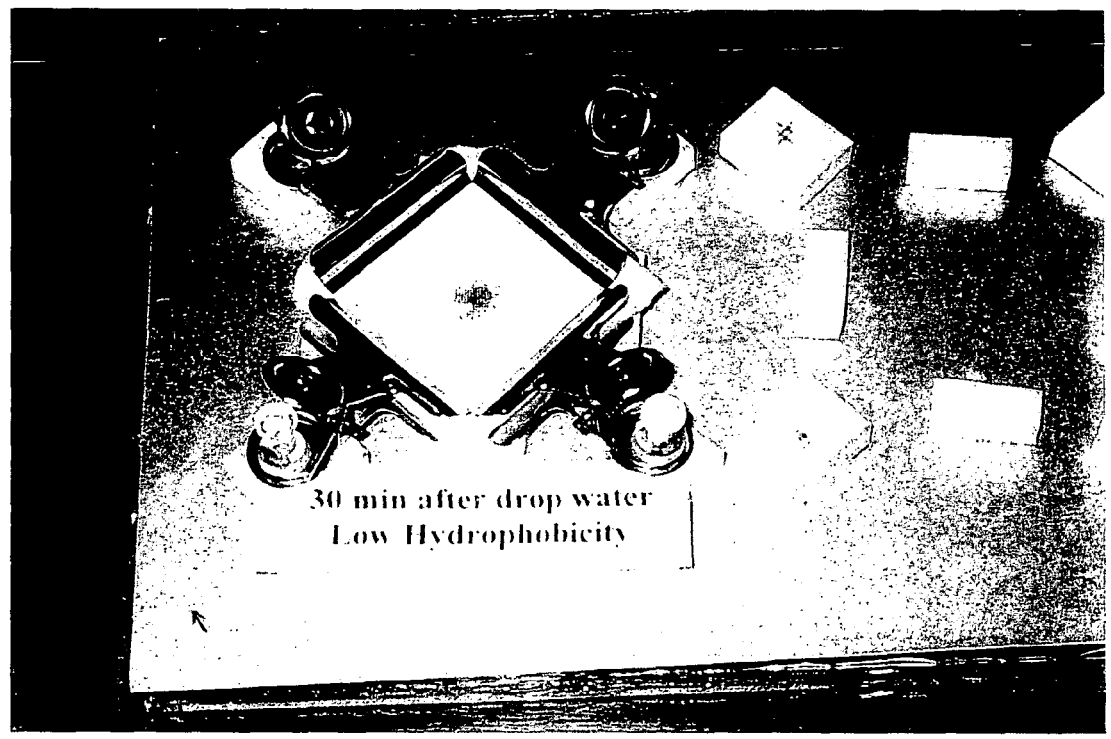
Figure 6:
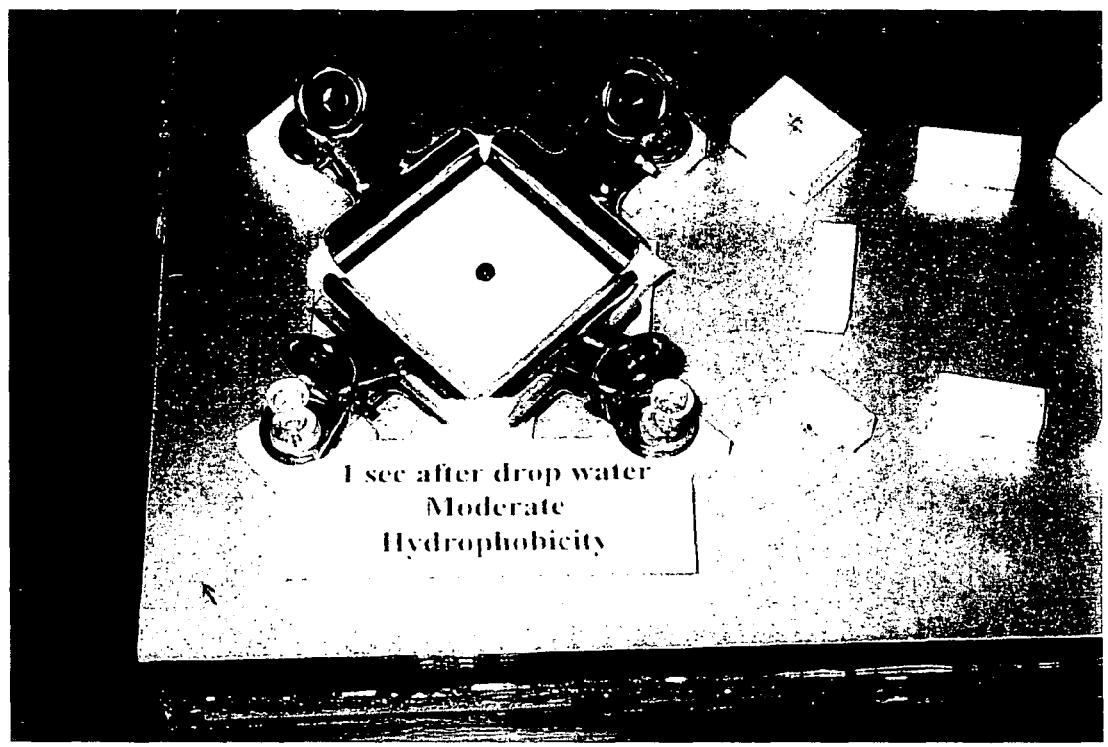
Figure 6:
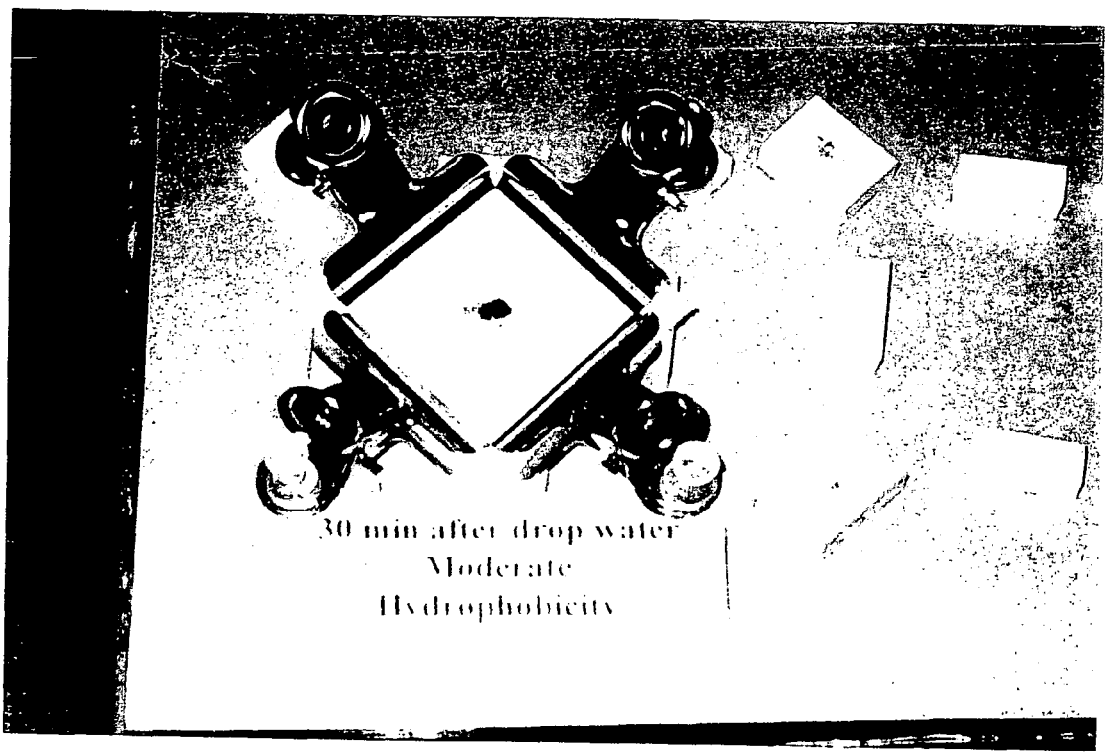
Figure 6:
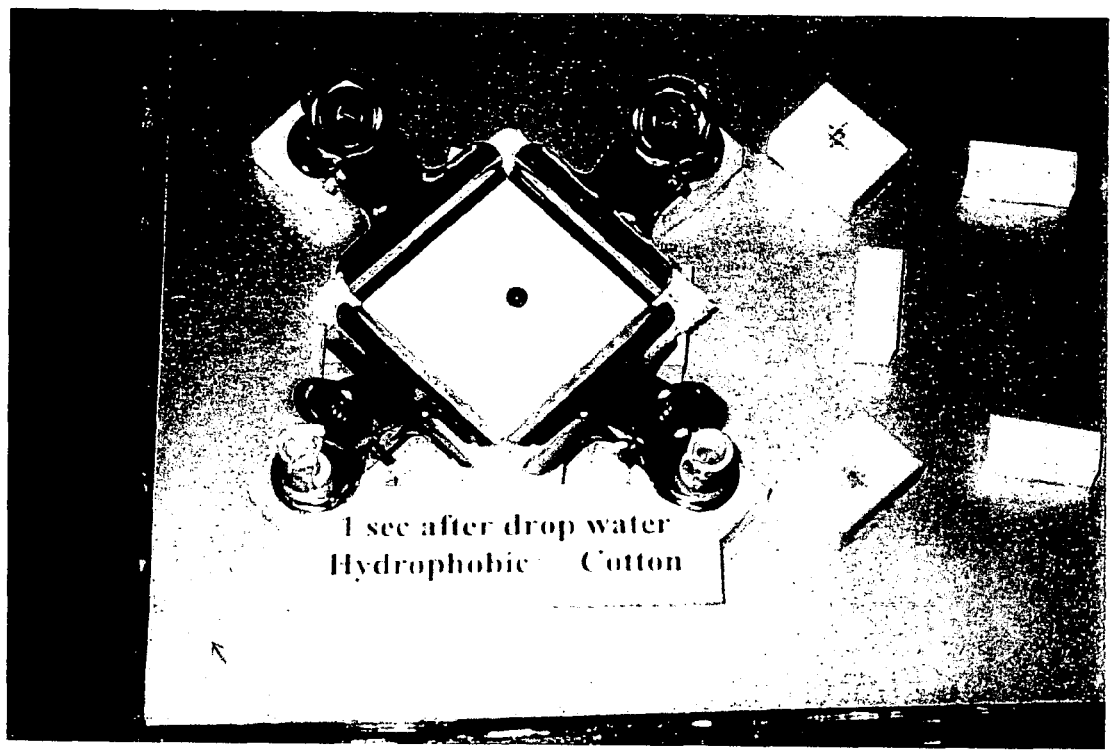
Figure 6:
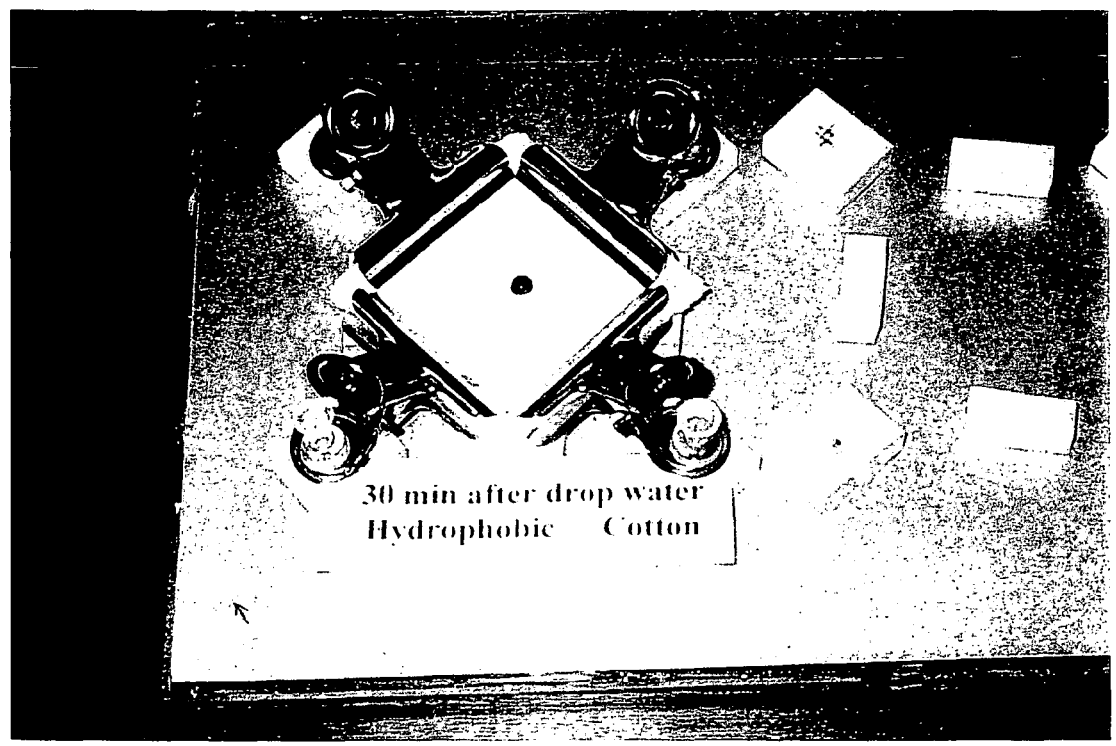

The water hydrophobicity drop test was used to test the hydrophobicity of the treated fabric. Special equipment was used for this test. As shown in FIG. 6, the equipment consists of four clips 220 fixed on several pieces of rubber bases 230 glued to a hard board 240. Each clip 220 has a width of 1.5 inch. The clips are arranged next to each other in a square formation. In the experiment, coated fabric 250, which measured approximately 2.2×2.2 in$^2$, was anchored by the four clips 250. To ensure equal tension in all experiments, a 1.5× 1.5 in$^2$ square was first drawn in the center of the coated fabric 250 to mark the lines where the fabric should be clipped. A drop of water 260 was then introduced by injecting exactly 10 uL of distilled water onto the fabric surface with a 20 uL syringe. To ensure that the drop was carefully placed on the fabric with no impact force, a transparent acrylic cover was made with small square openings on the top covered with thick plastic film. The syringe needle was pushed through a pinhole in the plastic film and the height of the cover was made such that, when the syringe came to rest on the plastic film, the tip of the needle would be just above the fabric surface stretched between the clips.

As the liquid was injected from the syringe, a spherical droplet was formed on the surface 251 of the coated fabric 250 surface. The droplet detached from the needle tip right above it as soon as all the 10 uL liquid in the syringe was injected and the timing was started at this point and stopped when the droplet disappeared. To determine if the coated fabric 250 was uniformly treated and to ensure the best accuracy, 10 readings were taken from each piece of the fabric, five on each side. The five spots on each side were taken by placing equally spaced droplets at the four corners of the coated fabric 250 and one in the fabric center. The average of the 10 readings was reported for each piece of fabric sample. FIG. 6 shows the drop test on fabrics with different levels of hydrophobicity.

When the water droplet was placed onto untreated cotton, the droplet disappeared within 1 second and spread to cover a wide area. For low hydrophobicity, there was some spreading of water droplet after 1 second but the droplet disappeared within 30 minutes. For moderate hydrophobicity, there was no spreading after 1 second but slight spreading within 30 minutes. For hydrophobic cotton, the water droplet did not spread out and it remained spherical after 30 minutes. In this work, the treated fabric on which the droplet remained spherical after 30 minutes was considered hydrophobic. In this case prolonged tests showed the droplet to evaporate from the fabric in 3 h without wetting the fabric surface.

6. Impact Penetration Test

The impact penetration test was carried out by the spray test which is an ISO standard method No. 4920-1981 (ISO, 1981). This test measures the wetting of fabric.

The equipment used in the impact penetration test consists of a plastic cone to which a spray head is applied and the fabric is stretched on a circular frame placed underneath the spray head at making an angle of 45°. The distance between the spray head and the fabric was 15 cm. At the start of the test 250 ml of distilled water was poured into the cone. The water flowed through the spray head onto the center of the fabric. After all the water had fallen on the fabric, the appearance of water on the test sample was compared with the pictures of standard wetted fabric used for rating. According to ISO standards, rating for water repellency of the fabric is divided into 6 grades depending on the wetting on the fabric after the spray test. The grading ranges from grade 0 for high wetting to grade ISO 5 for waterproof fabric.

7. Air Permeability

A Frazil Type Auto Air Permeability Tester was used to test air permeability (ASTM, D737-96). This test was carried out in the standard conditions of 65% RH, 27° C. In this equipment, the air is allowed to flow perpendicularly through a circular area of 7 cm diameter for a set period of time. The air flow rate was automatically adjusted by the tester to provide a pressure differential of at least 125 Pa across the specimen. From this air flow rate, the air permeability of the fabric was determined and the results displayed in volume of air per area of fabric per second.

Results

According to the admicellar polymerization methodology of the present invention, a hydrophobic cotton fabric was produced. The optimum conditions for the process were determined by varying the amounts of LAS, styrene monomer, and the initiator. The hydrophobic cotton produced under the optimum conditions was tested for its resistance to water impact penetration and air permeability. The coated surface of the fabric was also examined by SEM.

As previously discussed hereinabove, a typical admicellar polymerization process is a 3-step process, which consists of admicelle formation, adsolubilization, polymerization, and an optional washing step. The monomer is usually added in the adsolubilization step. However, to save time and facilitate mass transfer, the monomer can also be added at the admicelle formation step in order to allow admicelle formation to occur at the same time as adsolubilization.

Figure 7:
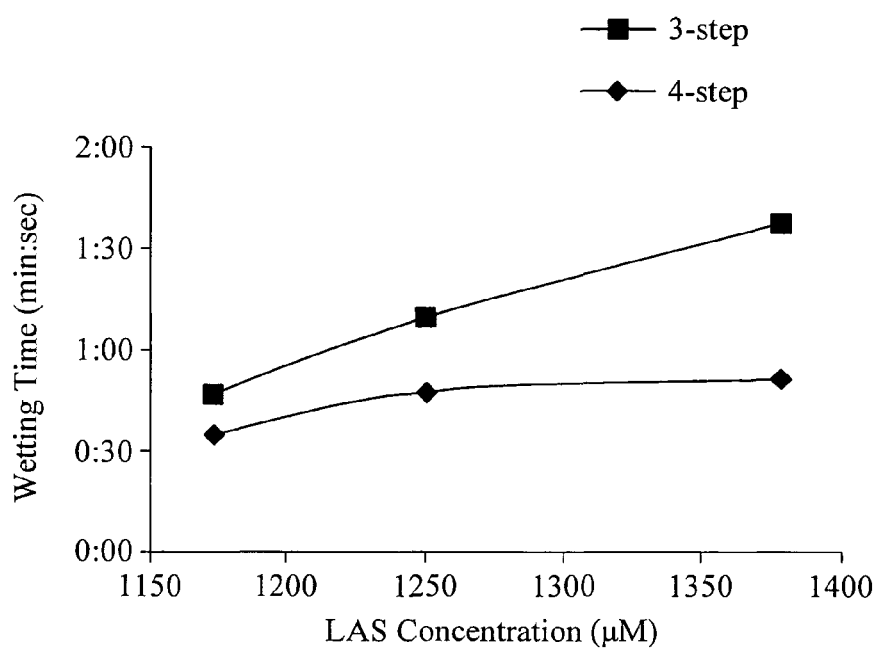
FIG. 7 is a graphical representation of results of the methodology of the present invention.

In this work, the results of a combined adsorption/adsolubilization (CAA) process and a separate adsorption-adsolubilization (SAA) process were compared using varying LAS concentration. In the SAA process, the admicelle formation step was first carried out for 48 hours in order to allow the process to reach equilibrium. This was followed by the adsolubilization step which also took 48 hours. In the CAA process, the admicelle formation and the adsolubilization occurred concurrently over 48 hours. The results shown in FIG. 7 show that all samples from the CAA process have a longer wetting time than the samples from the SAA. One of the possible reasons is in the amount of LAS dissolved in the supenatant. Supenatant of the CAA process may have more surfactant dissolved in it than in the SAA process where some amount of surfactant has already adsorbed onto the surface of the fabric to form the admicelle. The more LAS in the supernatant, the more styrene dissolves in it. Also since the initial LAS concentration was above the CMC, micelles present in the supernatant may carry styrene to the surface of cotton. Thus resulting in more styrene being adsorbed in the hydrophobic interior of the admicelle. Therefore more polymerization was able to take place in the CAA process. Hence, in this methodology, the CAA process was chosen to produce hydrophobic cotton fabric in all the experiments. FIG. 7 more particularly compares the wetting time of treated fabrics in a CAA and SAA process at varying LAS concentration [LAS:styrene ratio=1:10, initiator:styrene ratio=1:1, and polymerization time 2 hr at 80° C.].

1. Time for the Admicelle Formation and Adsolubilization

Figure 8:
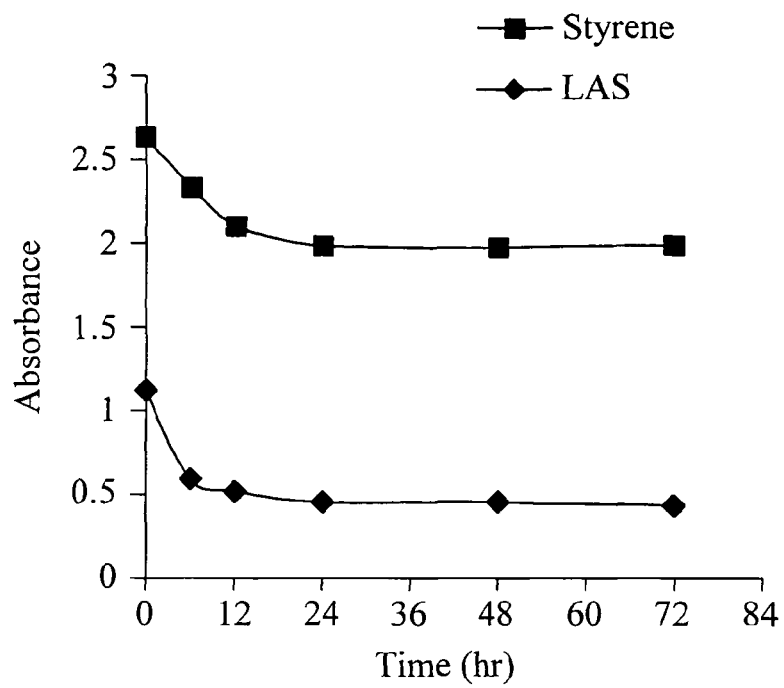
FIG. 8 is a graphical representation of results of the methodology of the present invention.

The optimum time for the simultaneous admicelle formation and adsolubilization steps was determined. In these experiments, the supernatant solution was taken out at different times and its absorbance was determined by UV-spectrophotometer. For styrene concentration, the absorbance was checked at a wavelength of 280 nm, and for LAS, the wavelength of 225 nm was used. In FIG. 8 it can be appreciated that the concentrations of both LAS and styrene decreased rapidly at the beginning until they reached an equilibrium at 24 hours. From these results, the optimum time for admicelle formation and adsolubilization is the time that the system reached equilibrium, which is 24 hours.

2. Time for Polymerization

Figure 9:
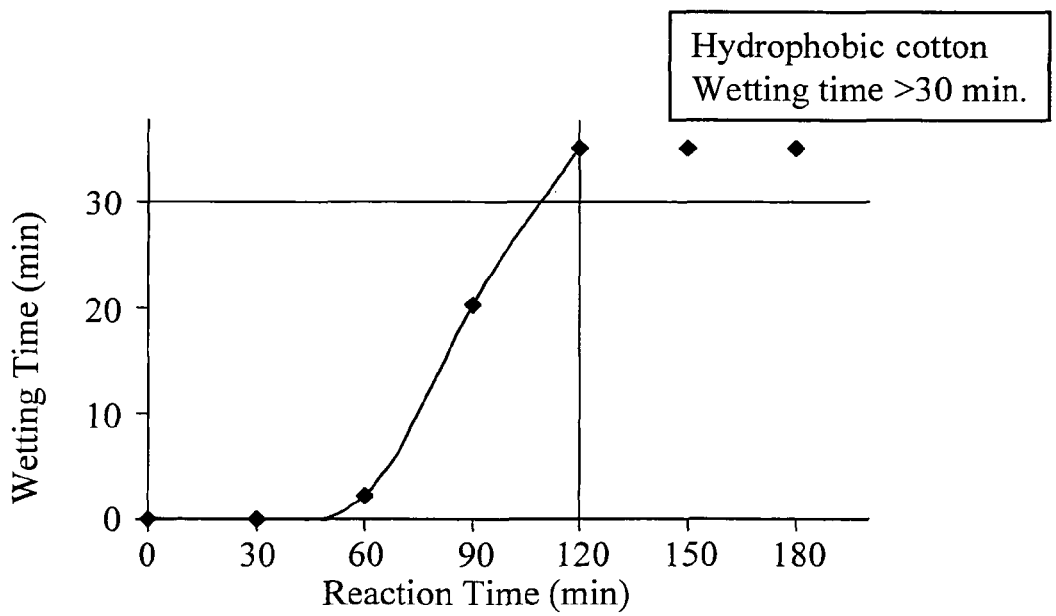
FIG. 9 is a graphical representation of the results of the methodology of the present invention.

In these experiments, the combined admicelle formation and adsolubilization step was allowed to reach equilibrium for 24 hours at 30° C. Afterward, the desired amount of initiator was injected and the temperature raised to 80° C. to start the polymerization reaction. The fabric was taken out at different times to check its hydrophobicity by the water hydrophobicity drop test discussed hereinabove. The results shown in FIG. 9 demonstrate that, at the beginning, there was an induction time where no polymerization took place, but after 60 minutes, the hydrophobicity of the fabric increased rapidly until hydrophobic cotton was achieved at 120 minutes. From the results, the reaction time used for polymerization step in the present invention was 120 minutes.

3. Amount of Initiator

Figure 10:
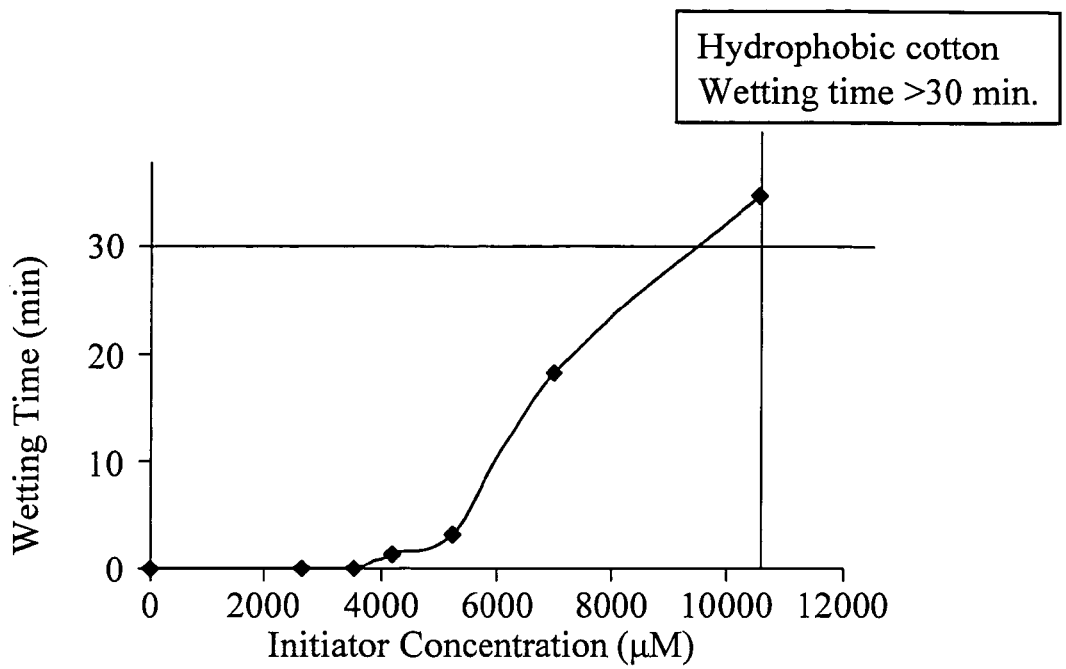
FIG. 10 is a graphical representation of the results of the methodology of the present invention.

In these experiments, LAS concentration was fixed at 1000 uM and LAS:styrene ratio was 1:10. The combined adsorption/adsolubilization step was carried out at 30° C. for 24 hours. Afterward, different amounts of initiator, ranging from 0-10000 uM, were added in the beginning of the polymerization step. The polymerization time was 2 h at 80° C. FIG. 10 shows the change in hydrophobicity of treated cotton fabric with vary amount of initiator. From the figure, it can be seen that hydrophobicity of the treated fabric increased with the amount of initiator. The increase was slow at low amount of initiator. At the concentration of 5000 uM, further increase in initiator concentration gave a rapid increase in wetting time until a hydrophobic fabric was achieved at the concentration of 10000 uM. At this point, the ratio of initiator:styrene equalled 1:1. FIG. 10 shows wetting time of treated fabric with varying amount of initiator [LAS concentration 1000 uM, LAS:styrene ratio=1:10, and polymerization time=2 hrs at 80° C.].

4. Amount of LAS

Figure 11:
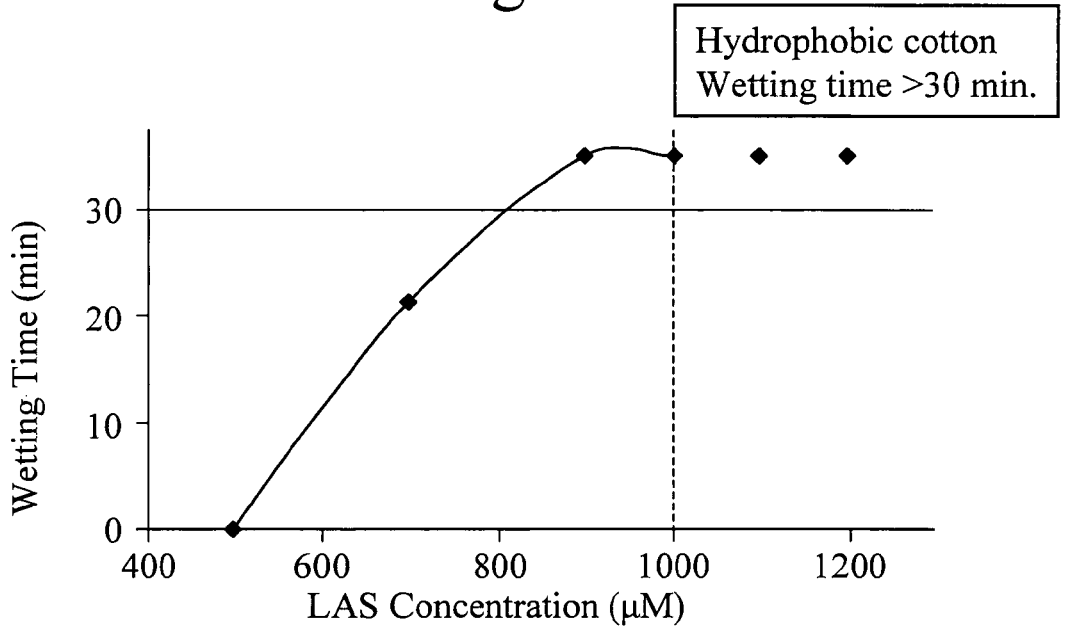
FIG. 11 is a graphical representation of the results of the methodology of the present invention.

In order to determine the optimum LAS concentration, the LAS:styrene ratio and the initiator:styrene ratio were fixed at 1:10 and 1:1, respectively. FIG. 11 shows the change in hydrophobicity of treated cotton fabric with varying initial LAS concentration. The results show that no polymerization took place at LAS concentration below 500 uM. Above 500 uM, hydrophobicity of the treated fabric increased rapidly with increase in initial LAS concentration. Hydrophobic fabric was finally achieved at the LAS concentration of 900 uM. In this work, the LAS concentration of 1000 uM which is below the CMC of LAS at 1050 uM was chosen for the production of hydrophobic cotton. FIG. 11 shows wetting time of treated fabric with varying LAS concentration [LAS:styrene ratio=1:10, initiator:styrene ratio=1:1, and polymerization time=2 hrs at 80° C.].

5. Amount of Styrene

Figure 12:
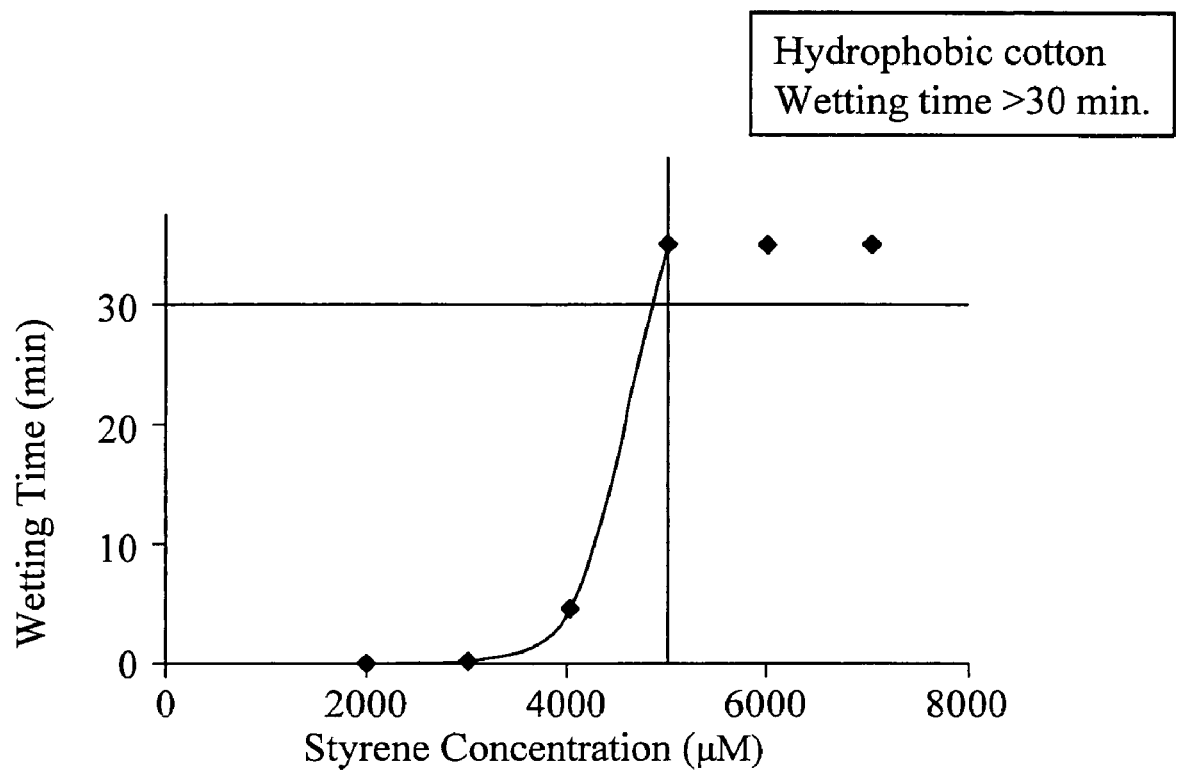
FIG. 12 is a graphical representation of the results of the methodology of the present invention.

In this experiment, the initial LAS concentration was fixed at 1000 uM and the initiator:styrene ratio fixed at 1:1. The styrene concentration was varied from 2000-7000 uM. FIG. 12 shows the change in hydrophobicity of treated cotton fabric with varying styrene concentration. It can be seen that, at low styrene concentration, there was no improvement in the hydrophobicity of the fabric, but the hydrophobicity of the fabric increased rapidly at 4000 uM with LAS:styrene ratio of 1:4. A hydrophobic fabric was finally achieved at the styrene concentration of 5000 uM, or at LAS:styrene ratio of 1:5, and this was taken as the optimum styrene concentration for the production of hydrophobic cotton. FIG. 12 shows wetting time of treated fabric with varying styrene concentration [LAS concentration 1000 uM, initiator:styrene ratio=1:1, and polymerization time=2 hrs at 80° C.].

6. Uniformity of the Treatment

To test the uniformity of the coating, in the determination of the hydrophobicity of the test fabric, 5 droplets were placed on each side of the fabric, one at each of the 4 corners and one in the middle. The results of these experiments showed that the coating was nonuniform when the treated fabric was not frilly hydrophobic but for frilly hydrophobic cotton, a uniform coating was achieved. In addition, no significant difference was observed in the hydrophobicity of the 2 sides of the fabric.

7. Spray Test

Figure 13:
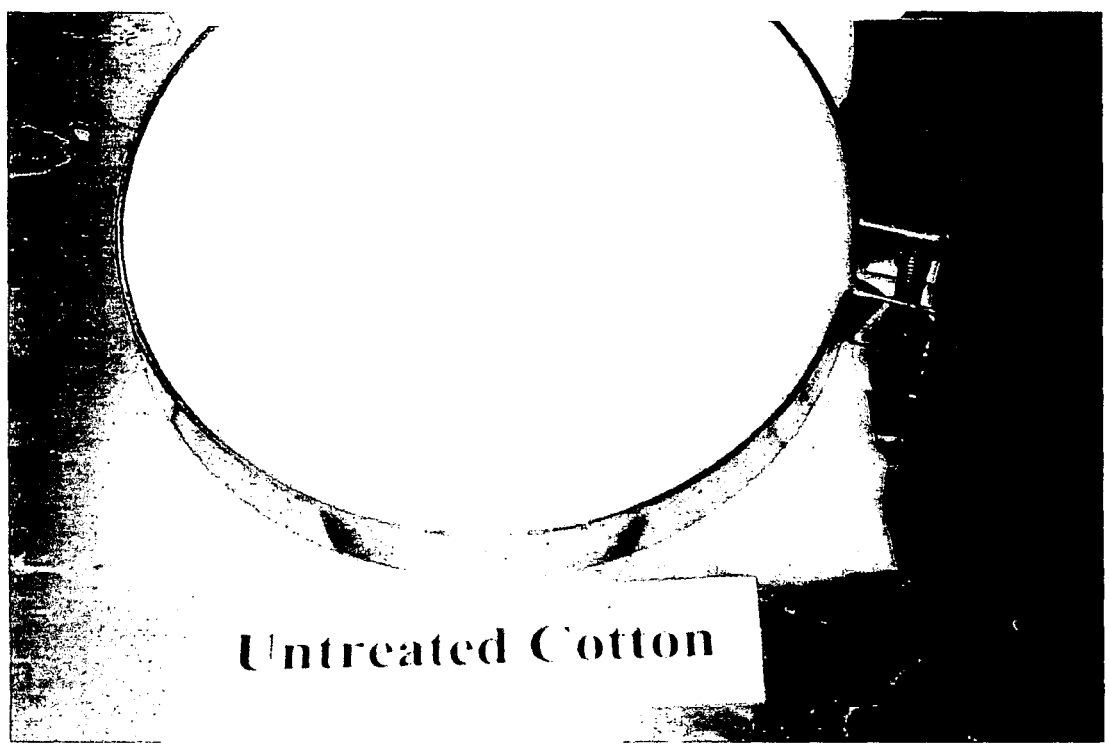
FIG. 13 is a series of photographic perspective views of the results of a spray test conducted on cotton cloth treated according to the methodology of the present invention.
Figure 13:
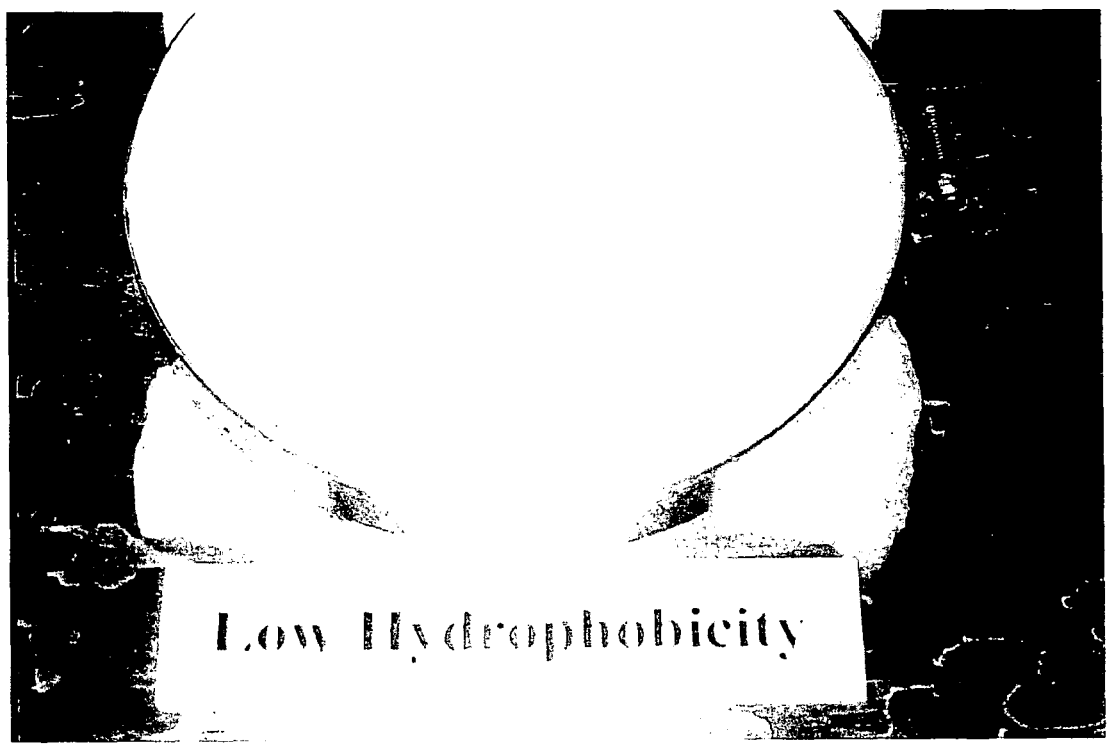
Figure 13:
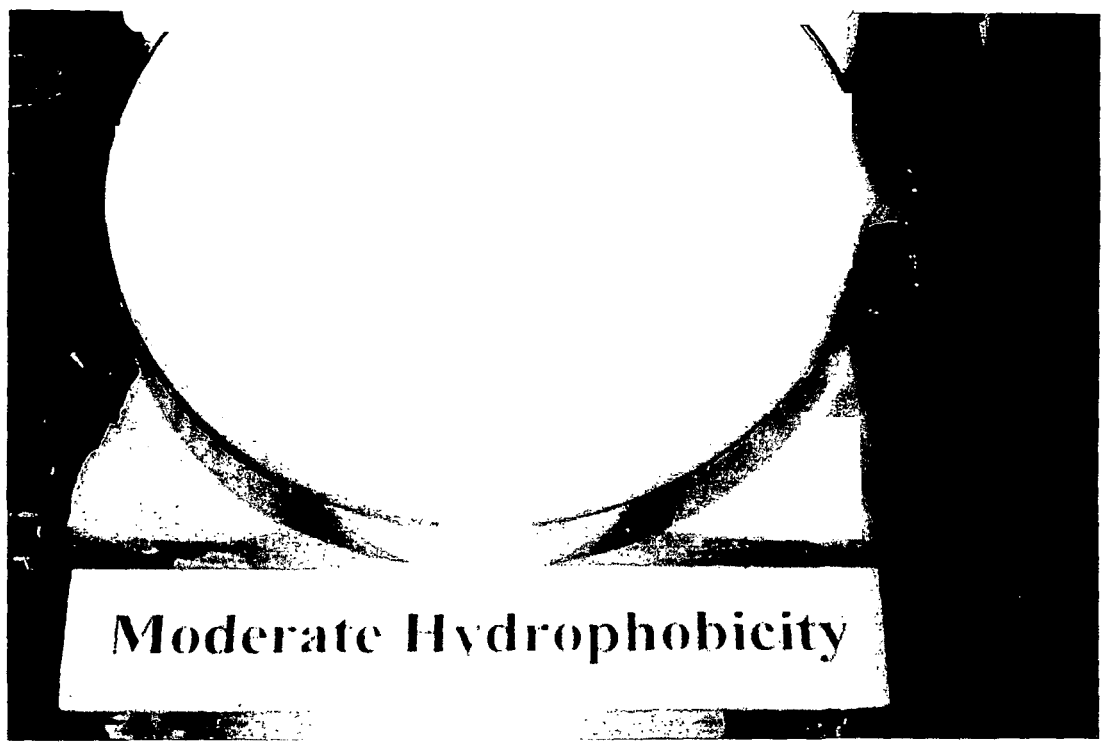
Figure 13:
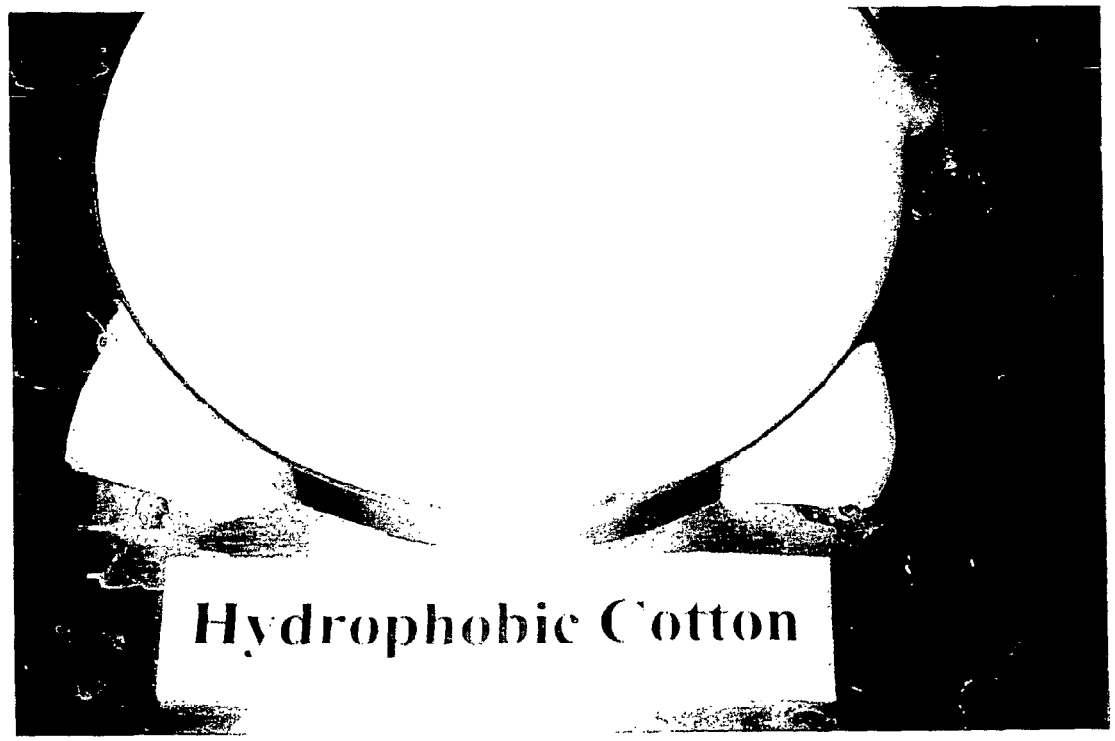

In order to carry out a spray or water impact penetration test, cotton fabrics with three levels of hydrophobicity were prepared by varying the LAS:styrene ratio. Altogether, four fabric samples: untreated cotton, low hydrophobic, moderate hydrophobic, and fully hydrophobic cotton fabrics, were tested. FIG. 13 shows the results of these tests. It shows that the untreated fabric had a complete wetting of the fabric surface. The wetting surface of low hydrophobic and moderate hydrophobic fabrics decreased gradually. In these cases, the unwetted surface can be seen at the top of the fabric. In the case of fully hydrophobic cotton, there were only a few wetting areas. By comparing the results with the standard fabrics, the fully hydrophobic cotton fabric produced in this work was found to achieve a grading of 3 in the ISO standard.

8. Air Permeability

The untreated and hydrophobic cotton fabrics were used in this test. The results of air permeability tests are shown in TABLE 1. The results show that both untreated cotton and hydrophobic cotton had almost the same air permeability indicating that the polystyrene coated on the fabric did not block the air from passing through the fabric. This means that hydrophobic cotton does not change the air permeability property significantly.

TABLE 1

| Type of cotton fabric | Air permeability ($cm^3/cm^2/sec$) |
| --- | --- |
| Untreated Cotton | 6.94 |
| Hydrophobic cotton | 7.11 |

9. Moisture Absorption

The four samples used in the spray test were tested for their absorption of molecular water. To measure moisture absorption, all samples were left in the standard conditions of 65% RH, 27° C. for 4 hours and weighed. After this, the samples were dried at 110° C. for 4 hours and weighed again. The moisture absorption of the fabric was calculated from the following equation.

$$\text{Moisture content}(\%) = \frac{\text{Weight in standard conditions} - \text{Dry Weight}}{\text{Dry Weight}} \times 100$$

The results in TABLE 2 show that the treated cotton fabrics had only a slight decrease in moisture content. The results show that the coating of fabric with polystyrene had minimal effect on the moisture absorption of the fabrics.

TABLE 2

| Type of cotton fabric | Moisture content (%) |
| --- | --- |
| Untreated cotton | 6.09 |
| Low hydrophobicity | 5.91 |
| Moderate hydrophobicity | 5.89 |
| Hydrophobic cotton | 5.98 |

10. Effect of Washing at High Temperature

In order to study the effect of washing at high temperature, the treated fabrics were washed only water at 95° C. for 3 hours. The results in TABLE 3 show that the hydrophobicity of the fabric decreased markedly after washing at the above conditions. Therefore, more study has to be carried out to improve the washability of the treated fabric.

TABLE 3

| Cotton No. | Wetting time (min:sec) | |
| --- | --- | --- |
| | Before washing | After washing |
| 1 | 0:27 | 0:09 |
| 2 | 4:56 | 0:48 |
| 3 | >30 | 3:00 |

11. Effect Time

In order to study the effect of washing time, the treated fabrics were washed at room temperature and taken out at different times. The results are shown in TABLE 4. The results show that the hydrophobicity of the treated fabrics did not decrease after washing within 120 minutes. However, the wetting time decreased significantly at washing times of 150 and 180 minutes. Therefore, in practice, washing time should not exceed 120 minutes in one wash to avoid the damage of the hydrophobic surface.

TABLE 4

| Washing time (mm) | Wetting time (min:sec) | |
| --- | --- | --- |
| | Before washing | After washing |
| 30 | >30 | >30 |
| 60 | >30 | >30 |
| 90 | >30 | >30 |
| 120 | >30 | >30 |
| 150 | >30 | 24:09 |
| 180 | >30 | 20:39 |

12. Surface Characterization of the Coated Fibers

Figure 14:
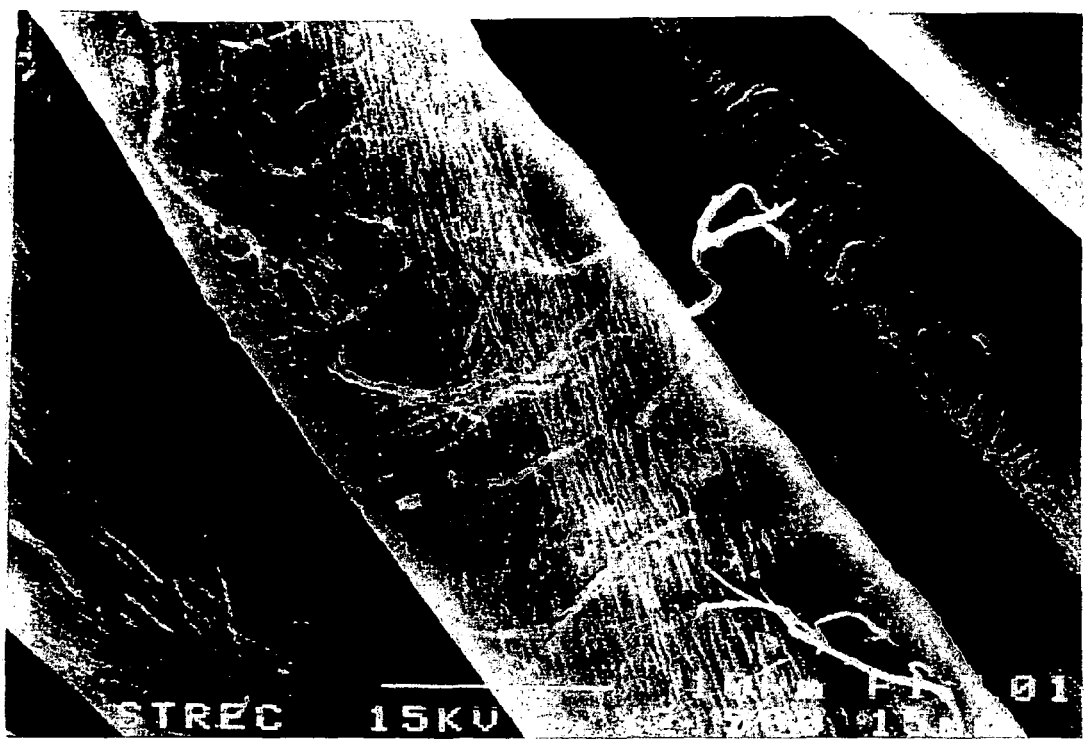
FIG. 14 is a series of photographic perspective views of scanning electron microscope views of (A) untreated cotton fabric and (B) cotton fabric treated according to the methodology of the present invention.
Figure 14:
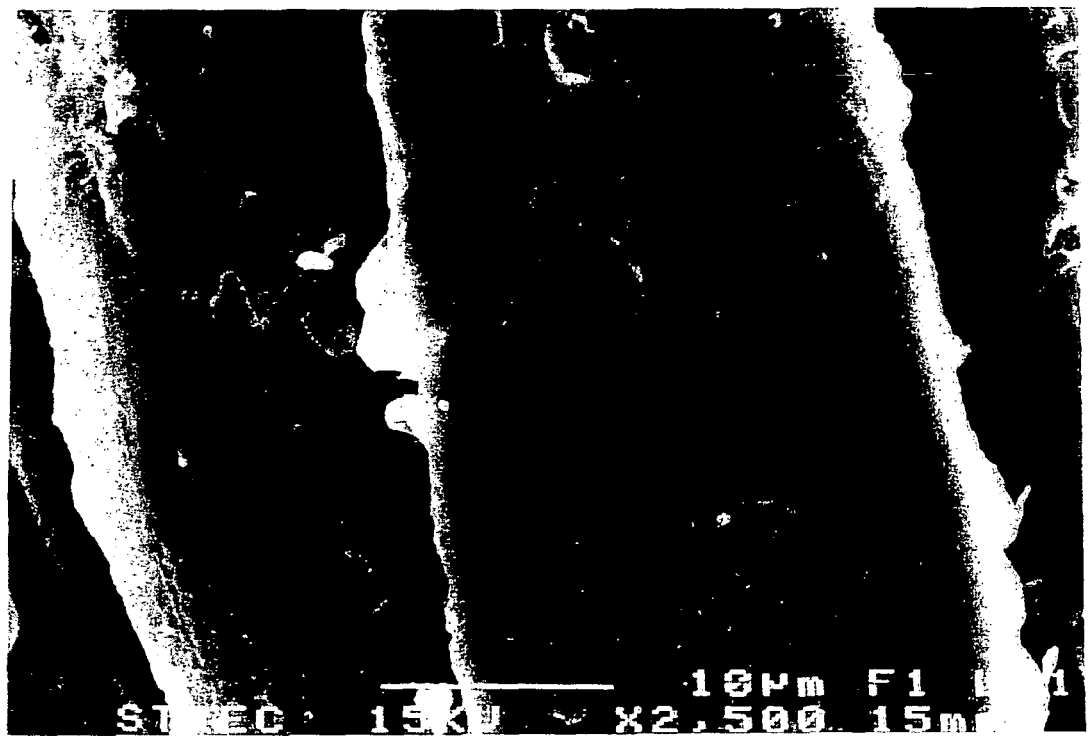

FIG. 14 shows the SEM micrographs of the untreated and treated cotton. The micrograph shows that the hydrophobic cotton had a film coated on the fiber. This confirmed that the fabric was successfully coated by the admicellar polymerization.

As the present invention shows, as evidenced by the above disclosure, a hydrophobic cotton fabric is produced by the admicellar polymerization process. In a preferred embodiment, the conditions are 1000 uM LAS concentration, 0.15 M NaCl, 1:5 LAS:styrene ratio, 1:1 initiator:styrene ratio, and polymerization is carried out at 80° C. for two hours. The hydrophobic cotton achieves a grade 3 on the spray test and retains air permeability of the fabric and the coating produced by the method of the present invention can withstand up to washing for 2 hours at room temperature.

Thus, in accordance with the present invention, there has been provided a method for making an article, such as cloth, water repellent and/or waterproof that fully satisfies the objectives and advantages set forth above. Although the invention has been described in conjunction with the specific drawings and language set forth above, it is evident that many alternatives, modifications, and variations will be apparent to those skilled in the art. Accordingly, it is intended to embrace all such alternatives, modifications and variations that fall within the spirit and broad scope of the invention.

We claim:

1. A method of making a substrate having an admicellar hydrophobic polymer coating thereon, comprising:

providing a substrate comprised of a plurality of individual fibers, each of the individual fibers having at least one surface, wherein the substrate is selected from the group consisting of cloth, burlap, polyesters, paper, cardboard and combinations thereof;

applying an admicellar hydrophobic polymer coating on the at least one surface of the plurality of individual fibers wherein voids are disposed between the plurality of individual fibers having the admicellar hydrophobic polymer coating on the at least one surface, introducing an aqueous hydrophobic coating composition containing a surfactant and a monomer of a hydrophobic polymer on the at least one surface of the plurality of individual fibers to form the admicellar hydrophobic polymer coating, wherein the surfactant is selected from the group consisting of sodium dodecyl sulfate, linear alkyl benzene sulfonate and combinations thereof and the monomer of a hydrophobic polymer is styrene;

introducing an initiator to the aqueous hydrophobic coating composition disposed on the at least one surface of the plurality of individual fibers to initiate an admicellar polymerization reaction on the at least one surface of the plurality of individual fibers coated with the aqueous hydrophobic coating composition for a predetermined period of time, wherein the initiator is AIBN; and heating the substrate having the hydrophobic coating composition disposed on the at least one surface of the plurality of individual fibers and the initiator introduced thereon to a temperature in a range of from about 40° C. to about 100° C. for a predetermined time in a range of from about 30 minutes to about 180 minutes.

* * * * *